(12) United States Patent
Yu et al.

(10) Patent No.: US 8,953,704 B2
(45) Date of Patent: *Feb. 10, 2015

(54) WIRELESS COMMUNICATION APPARATUS, WIRELESS COMMUNICATION SYSTEM AND WIRELESS COMMUNICATION METHOD

(71) Applicant: Panasonic Intellectual Property Corporation of America, Torrance, CA (US)

(72) Inventors: Qian Yu, Singapore (SG); Lei Huang, Singapore (SG); Masayuki Hoshino, Kanagawa (JP); Daichi Imamura, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/252,000

(22) Filed: Apr. 14, 2014

(65) Prior Publication Data

US 2014/0226742 A1   Aug. 14, 2014

Related U.S. Application Data

(63) Continuation of application No. 13/141,743, filed as application No. PCT/JP2010/000048 on Jan. 6, 2010, now Pat. No. 8,737,509.

(30) Foreign Application Priority Data

Jan. 7, 2009   (JP) ................. 2009-001352

(51) Int. Cl.
*H04B 7/02* (2006.01)
*H04B 7/04* (2006.01)
(Continued)

(52) U.S. Cl.
CPC ............ *H04B 7/0456* (2013.01); *H04B 7/0413* (2013.01); *H04B 7/0639* (2013.01);
(Continued)

(58) Field of Classification Search
USPC .......................... 375/267, 260, 299, 347, 349
See application file for complete search history.

(56) References Cited

U.S. PATENT DOCUMENTS

2003/0185309 A1   10/2003   Pautler et al.
(Continued)

FOREIGN PATENT DOCUMENTS

CN   101283536 A   10/2008
(Continued)

OTHER PUBLICATIONS

NTT DoCoMo et al; Investigations on Pre-coding Schemes for MIMO in E-UTRA Downlink, 3GPP TSG RAN WG1 Meeting #47, R1-063311, pp. 1-9 dated Nov. 6-10, 2006.
(Continued)

*Primary Examiner* — Kabir A Timory
(74) *Attorney, Agent, or Firm* — Pearne & Gordon LLP

(57) ABSTRACT

In a MIMO system using a cross-polarized antenna structure, even if no ideal XPD can be obtained, the interference between different polarized waves can be reduced to allow an effective precoding to be executed. When a MIMO communication is performed between a transmitter and a receiver each using a cross-polarized antenna structure, a channel estimating and precoding selection section of the receiver performs a channel estimation of MIMO channels from the transmitter to the receiver, decides a precoding matrix of a projection matrix for mutually orthogonalizing or substantially orthogonalizing the channel response matrixes for respective different polarized waves, and feeds the determined precoding matrix back to the transmitter. In the transmitter, a precoding processing section applies the precoding matrix to the spatial stream corresponding to one of the polarized waves to perform a precoding, thereby allowing the transmitter to transmit the polarized waves with the orthogonality therebetween maintained.

7 Claims, 9 Drawing Sheets

(51) Int. Cl.
*H04B 7/06* (2006.01)
*H04B 7/10* (2006.01)
*H04L 25/03* (2006.01)
*H04B 7/00* (2006.01)
*H04L 25/02* (2006.01)

(52) U.S. Cl.
CPC ........... *H04B 7/10* (2013.01); *H04L 25/03898* (2013.01); *H04L 25/03961* (2013.01); *H04B 7/0469* (2013.01); *H04B 7/002* (2013.01); *H04B 7/0617* (2013.01); *H04B 7/0634* (2013.01); *H04B 7/0691* (2013.01); *H04L 25/0224* (2013.01); *H04L 25/0248* (2013.01); *H04L 2025/03808* (2013.01)
USPC ........... 375/267; 375/260; 375/299; 375/347; 375/349

(56) References Cited

U.S. PATENT DOCUMENTS

| | | |
|---|---|---|
| 2008/0037681 A1 | 2/2008 | Walton et al. |
| 2008/0186212 A1 | 8/2008 | Clerckx et al. |
| 2008/0192849 A1 | 8/2008 | Kim et al. |
| 2008/0303699 A1 | 12/2008 | Zhang et al. |
| 2009/0124210 A1 | 5/2009 | Imai et al. |
| 2010/0067605 A1 | 3/2010 | Jongren |
| 2011/0058621 A1 | 3/2011 | Clerckx et al. |
| 2011/0096851 A1 | 4/2011 | Clerckx et al. |
| 2011/0128917 A1 | 6/2011 | Ko et al. |
| 2011/0280342 A1 | 11/2011 | Kim et al. |
| 2012/0069919 A1 | 3/2012 | Clerckx et al. |
| 2013/0028343 A1 | 1/2013 | Jongren |
| 2013/0100996 A1 | 4/2013 | Clerckx et al. |

FOREIGN PATENT DOCUMENTS

| | | |
|---|---|---|
| JP | 2000-165339 A | 6/2000 |
| JP | 2007-214780 A | 8/2007 |
| JP | 2008-211476 A | 9/2008 |
| WO | 2008/133582 A2 | 11/2008 |

OTHER PUBLICATIONS

International Search Report for PCT/JP2010/000048 dated Mar. 2, 2010.
Chinese Office Action for Application No. 2010800040761 dated Aug. 27, 2013.
Hidekazu Taoka, Field Experiments on 1-Gbps High-Speed Packet Transmission Using MIMO Multiplexing with Cross-Polarized Antennas, The Institute of Electronics, May 28, 2013, pp. 13-18.
Extended European search report for Application No. 10729168.4-1852/2375604 PCT/JP2010000048 dated Jun. 30, 2014.
Extended European search report for Application No. 13178557.8-1852/2660991 dated Jul. 2, 2014.

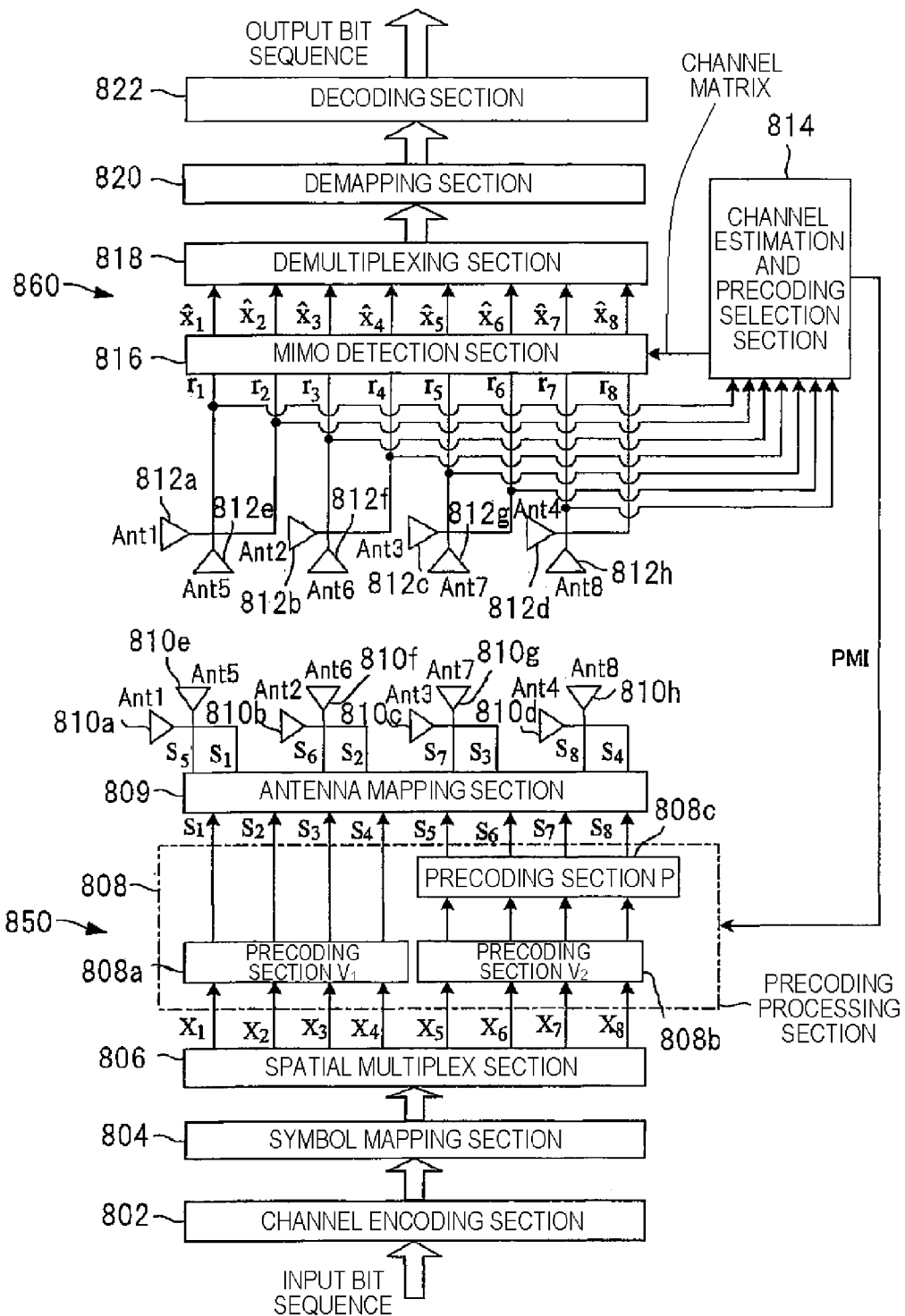

FIG. 9

Table 6.3.3.2-1: Codeword-to-layer mapping for spatial multiplexing

| Number of layers | Number of code words | Codeword-to-layer mapping $i = 0,1,...,M_{symb}^{layer} - 1$ |
|---|---|---|
| 1 | 1 | $x^{(0)}(i) = d^{(0)}(i)$    $M_{symb}^{layer} = M_{symb}^{(0)}$ |
| 2 | 2 | $x^{(0)}(i) = d^{(0)}(i)$<br>$x^{(1)}(i) = d^{(1)}(i)$    $M_{symb}^{layer} = M_{symb}^{(0)} = M_{symb}^{(1)}$ |
| 2 | 1 | $x^{(0)}(i) = d^{(0)}(2i)$<br>$x^{(1)}(i) = d^{(0)}(2i+1)$    $M_{symb}^{layer} = M_{symb}^{(0)}/2$ |
| 3 | 2 | $x^{(0)}(i) = d^{(0)}(i)$<br>$x^{(1)}(i) = d^{(1)}(2i)$    $M_{symb}^{layer} = M_{symb}^{(0)} = M_{symb}^{(1)}/2$<br>$x^{(2)}(i) = d^{(1)}(2i+1)$ |
| 4 | 2 | $x^{(0)}(i) = d^{(0)}(2i)$<br>$x^{(1)}(i) = d^{(0)}(2i+1)$    $M_{symb}^{layer} = M_{symb}^{(0)}/2 = M_{symb}^{(1)}/2$<br>$x^{(2)}(i) = d^{(1)}(2i)$<br>$x^{(3)}(i) = d^{(1)}(2i+1)$ |

WIRELESS COMMUNICATION APPARATUS, WIRELESS COMMUNICATION SYSTEM AND WIRELESS COMMUNICATION METHOD

CROSS-REFERENCE TO RELATED APPLICATIONS

This application is a continuation of U.S. patent application Ser. No. 13/141,743 filed on Jun. 23, 2011 which is based on Japanese Patent Application No. 2009-001352 filed on Jan. 7, 2009. The contents of these applications are herein incorporated by reference in their entirety.

TECHNICAL FIELD

The present invention relates to a wireless communication apparatus, a wireless communication system and a wireless communication method used in a MIMO (Multiple Input Multiple Output) system that conducts communication by use of a plurality of antennas.

BACKGROUND ART

The MIMO system is a communication system using a plurality of transmission antennas and a plurality of reception antennas for data communication. An access point to which a user terminal is connected can conduct communication with one user terminal or more at an arbitrary required point in time over a downlink and an uplink. The downlink (i.e., a forward link) is a communication link originating from the access point to the user terminal, whilst the uplink (i.e., a backward link) is a communication link originating from the user terminal to the access point.

The access point is usually a wireless communication device realized by a stationary base station that establishes communication with the user terminal and is often called a base station or in another technical term. The user terminal is a stationary or mobile wireless communication device and often called a base station, a wireless device, a mobile station, user equipment, or in another technical term. In the following descriptions, a base station (BS) is used for the access point, and user equipment (UE) is used for the user terminal.

A closed-loop MIMO system usually transmits channel status information from a receiver to a transmitter. Specifically, when performing precoding or beamforming operation, the closed-loop MIMO system uses channel status information fed back from the receiver to the transmitter in the communication system, thereby implementing channel optimization. Precoding is a technique of, when a plurality of antennas in a MIMO system make a transmission, forming a beam appropriate for circumstances of a propagation path by means of transmitting weighted data from the respective antennas, thereby making the transmission. In order to cause the transmission to reflect circumstances of observation of a received signal achieved at a receiving point (i.e., propagation path conditions), a feedback signal including beam information is transmitted at this time from the receiver to the transmitter, and the transmitter controls the beam by use of the feedback signal (see; for instance, Patent literature 1). Precoding has been under debate in relation to LTE (Long Term Evolution) of a next-generation system whose standardization activity has been performed on a 3GPP (3rd Generation Partnership Project) that is an international standardization organization of a portable phone.

In relation to transmission of the MIMO system, when a higher-order MIMO system uses a maximum of eight transmission antennas for a downlink channel or when spatial limits are imposed on setting of an antenna for an uplink channel in a user terminal of a MIMO system, utilization of a cross-polarized antenna structure is effective. If cross-polarized antennas assigned different polarized waves are used respectively for a transmitter and a receiver, an imbalance will occur in gains (or power) of and correlation among elements of a channel matrix. As a consequence, the elements of the channel matrix exhibit more complex behaviors. However, in order to lessen complexity of implementation and retain one code book intended for all applications (various antenna structures), the current LTE includes no code book specifically designed for the cross-polarized antenna structure. Since the cross-polarized antenna structure exhibits distinguished usefulness, distinguished performance advantages will be yielded as a result of addition of a code book of this type at the time of development of the LTE to a next advanced LTE.

A code book using a section diagonal matrix is conceivable as being intended for precoding operation of a MIMO system using a cross-polarized antenna structure (hereinafter referred to as a "cross-polarized MIMO system"). A premise for ideal XPD (Cross Polarization Discrimination) is applied for the code book of this type. In this case, the channel matrix can be approximated by a section diagonal matrix. In general, however, ideal XPD cannot always be expected. A precoding matrix using a code book of this type cannot be matched to a structure of a channel matrix at this time. Therefore, when conditions for ideal XPD are not satisfied, precoding performance is deteriorated. As mentioned above, a necessity for making the precoding technique for the cross-polarized MIMO system efficient from both a transmission performance viewpoint and a signaling viewpoint exists in this field.

CITATION LIST

Patent Literature

Patent Literature 1: US Patent Publication No. 2008/0037681

SUMMARY OF THE INVENTION

Technical Problem

As mentioned above, ideal XPD is not accomplished in a common actual usage environment for the cross-polarized MIMO system. Therefore, since a code book using a section diagonal matrix based on ideal XPD is used as a precoding matrix, interference between different polarized waves still remains, which raises a problem of deterioration of performance, which would otherwise arise when precoding is performed.

The present invention has been conceived in light of the circumstance and aims at providing a wireless communication apparatus, a wireless communication system and a wireless communication method that enable a MIMO system using a cross-polarized antenna structure to lessen interference between different polarized waves and perform effective precoding even when the MIMO system cannot accomplish ideal XPD.

Solution to Problem

The present invention provides, as a first aspect, a wireless communication apparatus that has a cross-polarized antenna structure and that is used in a wireless communication system capable of performing multiplex communication by means of MIMO, the wireless communication apparatus including: a spatial multiplexing section that is configured to generate, as data to be transmitted to a communication apparatus on the other end, a plurality of streams to be spatially multiplexed between a plurality of transmission antennas; a precoding processing section that is configured, in accordance with control information fed back from the communication apparatus on the other end, to apply a precoding matrix of a projection matrix for mutually orthogonalizing or substantially orthogonalizing channel response matrices for respective different polarized waves, with respect to a stream corresponding to one of a plurality of polarized waves, thereby performing precoding; and a transmission section that is configured to transmit the plurality of streams subjected to precoding processing from the plurality of cross-polarized transmission antennas.

The present invention also includes, as a second aspect, the wireless communication apparatus, wherein the precoding processing section performs first precoding for applying a first precoding matrix for forming a transmission beam to streams corresponding to the plurality of different polarized waves and also performs second precoding for applying a second precoding matrix of the projection matrix to the stream corresponding to the one of the polarized waves.

The present invention also includes, as a third aspect, the wireless communication apparatus, wherein the precoding processing section separates the streams corresponding to the plurality of different polarized waves on polarized wave basis, and applies, as the first precoding matrix, a precoding matrix corresponding to each polarized wave with respect to a stream corresponding to the each polarized wave, thereby performing precoding.

The present invention also includes, as a fourth aspect, the wireless communication apparatus, wherein the precoding processing section uses, as the second precoding matrix of the projection matrix, a unitary matrix by means of which a diagonal sum of inner products of the precoding matrix applied to the stream corresponding to the each polarized wave comes to a predetermined value or less.

The present invention also includes, as a fifth aspect, the wireless communication apparatus, wherein the transmission section has a total of four transmission antennas, two of which are provided for a first polarized wave of two different polarized waves and the other two of which are provided for a second polarized wave of the two different polarized waves, and the precoding processing section subjects a stream corresponding to the second polarized wave to precoding originating from the projection matrix.

The present invention also includes, as a sixth aspect, the wireless communication apparatus, wherein the transmission section has a total of four transmission antennas, two of which are provided for a first polarized wave of two different polarized waves and the other two of which are provided for a second polarized wave of the two different polarized waves, and performs antenna assignment when transmitting spatially multiplexed three streams from the transmission antennas in such a way that a first stream is assigned to the two antennas for the first polarized wave and that second and third streams are assigned respectively to the two antennas for the second polarized wave, and the precoding processing section subjects the second and third streams corresponding to the second polarized wave to precoding originating from the projection matrix.

The present invention also includes, as a seventh aspect, the wireless communication apparatus, wherein the transmission section has a total of eight transmission antennas, four of which are provided for a first polarized wave of two different polarized waves and the other four of which are provided for a second polarized wave, and the precoding processing section subjects a stream corresponding to the second polarized wave to precoding originating from the projection matrix.

The present invention provides, as an eighth aspect, a wireless communication apparatus that has a cross-polarized antenna structure and that is used in a wireless communication system capable of performing multiplex communication by means of MIMO, the wireless communication apparatus including: a channel estimation section that is configured to perform a channel estimation of a propagation path from a communication apparatus on the other end to the wireless communication apparatus; a precoding selection section that is configured, in accordance with a result of the channel estimation, to determine a precoding matrix of a projection matrix to be applied to a channel response matrix for one of polarized waves for mutually orthogonalizing or substantially orthogonalizing channel response matrices for respective different polarized waves; a control information notification section that is configured to feed back control information including precoding information representing the determined precoding matrix to the communication apparatus on the other end; a receiving section that is configured to receive data transmitted from the communication apparatus on the other end by means of a plurality of reception antennas; a separation section that is configured to separate the received data and detect a plurality of streams from the received data; and a decoding section that is configured to decode reception data from the plurality of detected streams.

The present invention also includes, as a ninth aspect, the wireless communication apparatus, wherein the precoding selection section calculates a unitary matrix, in which a diagonal sum of inner products of a precoding matrix to be applied to each of the different polarized waves comes to a predetermined value or less, from a channel response matrix of the propagation path from the communication apparatus on the other side or selects the unitary matrix from a code book including a group of preset matrices, thereby determining the precoding matrix.

The present invention also includes, as a tenth aspect, the wireless communication apparatus, wherein the precoding selection section determines a first precoding matrix for forming a transmission beam to be applied to the plurality of different polarized waves and a second precoding matrix derived from the projection matrix to be applied to the one of the polarized waves, and the control information notification section reports precoding information representing the first precoding matrix and the second precoding matrix to the communication apparatus on the other end.

The present invention also includes, as an eleventh aspect, the wireless communication apparatus, wherein the precoding selection section determines, for each of the plurality of different polarized waves, a precoding matrix corresponding to the each of the plurality of the polarized waves as the first precoding matrix.

The present invention provides, as a twelfth aspect, a wireless communication method for use with a wireless communication system that can perform multiplex communication by means of MIMO and through use of a wireless communication apparatus having a cross-polarized antenna structure, the wireless communication method including the steps of: generating, as data to be transmitted to a communication apparatus on the other end, a plurality of streams to be spatially multiplexed between a plurality of transmission antennas; applying, in accordance with control information fed back from the communication apparatus on the other end, a precoding matrix of a projection matrix for mutually orthogonalizing or substantially orthogonalizing channel response matrices for the respective different polarized waves with respect to a stream corresponding to one of a plurality of different polarized waves, thereby performing precoding; and transmitting the plurality of streams subjected to precoding processing by means of the plurality of cross-polarized transmission antennas.

The present invention provides, as a thirteenth aspect, a wireless communication method for use with a wireless communication system that can perform multiplex communication by means of MIMO and through use of a wireless communication apparatus having a cross-polarized antenna structure, the wireless communication method including the steps of: performing channel estimation of a propagation path from a communication apparatus on the other end to the wireless communication apparatus; determining, in accordance with a result of the channel estimation, a precoding matrix of a projection matrix to be applied to a channel response matrix for one of polarized waves for the purpose of mutually orthogonalizing or substantially orthogonalizing channel response matrices for respective different polarized waves; feeding back control information including precoding information representing the determined precoding matrix to the communication apparatus on the other end; receiving data transmitted from the communication apparatus on the other end by means of a plurality of reception antennas; separating the received data and detecting a plurality of streams from the received data; and decoding reception data from the plurality of detected streams.

Even when ideal XPD is not accomplished, a precoding matrix of a projection matrix derived from a channel response matrix is applied to one of polarized waves by means of the above-mentioned configuration, thereby making it possible to perform effective precoding for maintaining linearity between different polarized waves and minimize interference between the different polarized waves.

Advantageous Effects of the Invention

Even when a MIMO system using a cross-polarized antenna structure cannot accomplish ideal XPD, the present invention makes it possible to lessen interference between different polarized waves and perform effective precoding.

BRIEF DESCRIPTION OF THE DRAWINGS

FIG. 8 is a block diagram showing, as a sixth embodiment of the present invention, a sixth example configuration of the wireless communication system using the cellular wireless communication network.

FIG. 9 shows example codeword-to-layer mapping in spatial multiplex.

DESCRIPTION OF THE EMBODIMENTS

Figure 1:
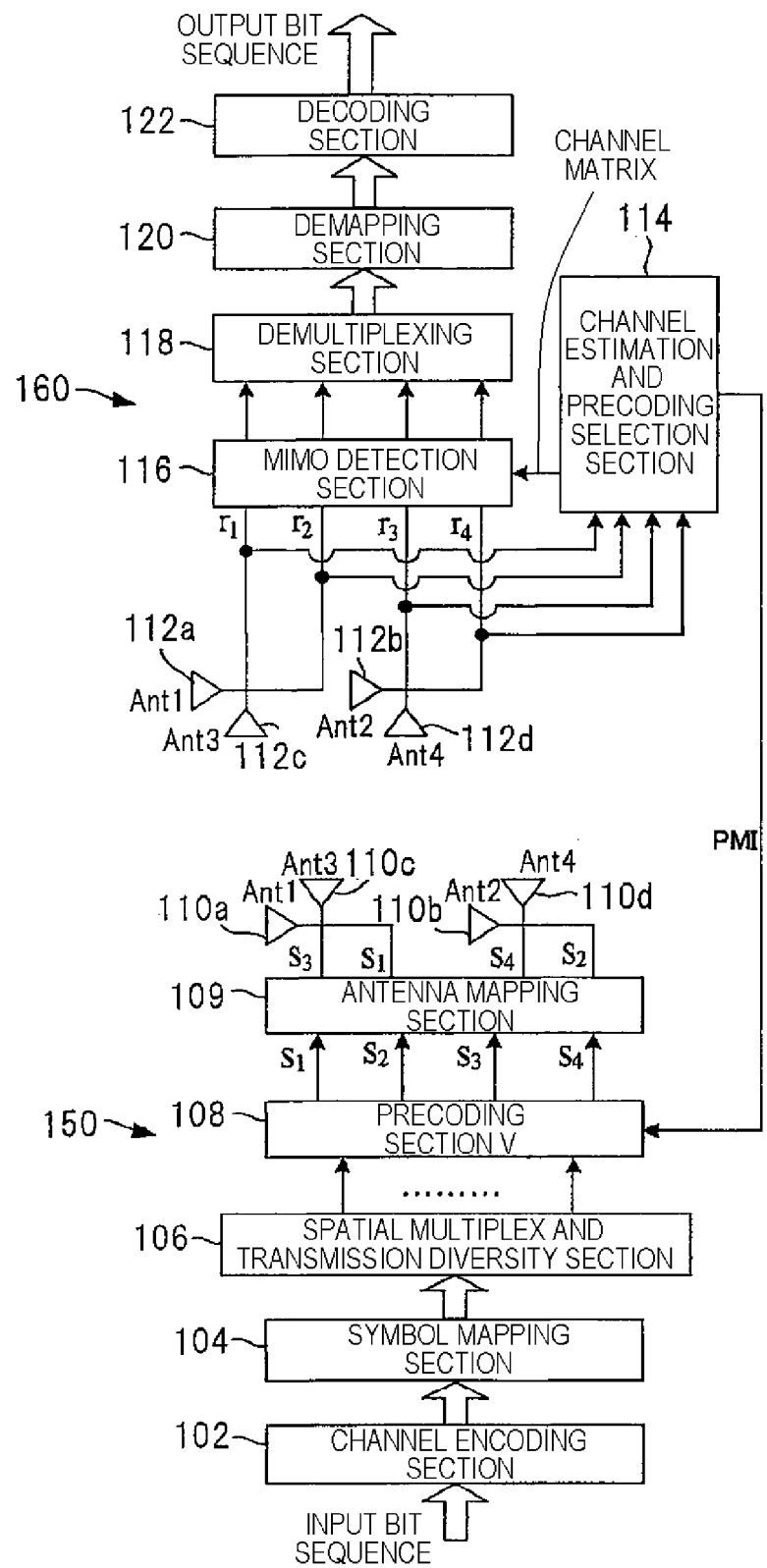
FIG. 1 is a block diagram showing an example configuration of a MIMO system having one transmitter and one receiver.

Embodiments show, as an example wireless communication apparatus, an example wireless communication system and an example wireless communication method of the present invention, an example configuration of a wireless communication system that applies a cross-polarized MIMO to a downlink of a cellular wireless communication network and that establishes communication between a base station (BS) and user equipment (UE) by use of a cross-polarized antenna. On this occasion, a closed loop cross-polarized MIMO system is assumed to perform precoding operation.

The present embodiments generally relate to remote communication and, more particularly, a method, an apparatus, and a product for use with a plurality of antenna transmission using a cross-polarized antenna structure in a MIMO system.

A technique for performing precoding control operation in the cross-polarized MIMO system is first described. The technique can be used in combination with various wireless techniques, such as a Code Division Multiple Access (CDMA), an Orthogonal Frequency Division Multiplexing (OFDM), a Time Division Multiple Access (TDMA), and the like. In response to an uplink or downlink transmission from/to a transmitter having a plurality of antennas to/from a receiver having a plurality of antennas, the receiver measures and estimates a channel by use of a reference signal that is to serve as a standard, whereby a channel response matrix is acquired. A plurality of different polarized antennas, such as vertically polarized antennas and horizontally polarized antennas, are used as the plurality of antennas each of which has a cross-polarized antenna structure. The thus-acquired channel response matrix can be separated into two parts that represent channel responses of different polarized waves of the transmission antennas. According to the channel response matrix that can be separated into two parts, the receiver can select different precoding matrices for respective transmission data streams of different polarized waves. The receiver feeds back the selected precoding matrices to the transmitter. The transmitter applies the thus-fed-back respective precoding matrices to corresponding polarized data streams, to thus perform precoding. The thus-precoded data streams are transmitted respectively from different polarized antennas. At this time, among different precoding matrices intended for different polarized waves, a more stringent precoding matrix is applied to one polarized wave from the transmitter, thereby performing interference mitigation for mitigating interference from different polarized waves.

The system and method of the present embodiments disclosed herein fulfill the necessity described in connection with the problem, by means of providing a method for transmitting data from a transmitter to a receiver in a cellular wireless communication system used in mobile telephone communication, or the like. The present embodiments are provided by means of applying cross-polarized precoding to the MIMO system using the cross-polarized antenna structure. According to the present embodiments, interference between different polarized waves, such as a vertical polarized wave and a horizontal polarized wave, is minimized, so that a poor XPD characteristic of a channel of the cross-polarized MIMO system can be compensated for. Thus, precoding performance can be enhanced, and transmission performance can be improved.

The present embodiments include the processing procedures provided below.

(1) A step of a receiver estimating a channel response matrix observed between a plurality of antennas of a transmitter and a plurality of antennas of the receiver by use of a reference signal transmitted from the transmitter.

(2) A step of the receiver separating the channel response matrix into two parts representing channel responses from different polarized transmission antennas.

(3) A step of the receiver selecting two precoding matrices for data transmission of different polarized waves from the transmitter.

(4) A step of the receiver selecting an additional precoding matrix for data transmission of one of the polarized waves from the transmitter.

(5) A step of the receiver feeding back the selected precoding matrix to the transmitter.

(6) A step of the transmitter transmitting a data stream according to signaling allocated to a corresponding downlink.

(7) A step of the receiver receiving a data stream from the transmitter, to thus perform MIMO detection processing and acquire a reproduced data stream.

According to one embodiment, the cellular wireless communication system includes a transmitter having a plurality of cross-polarized antennas and one receiver having a plurality of cross-polarized antennas. The cellular wireless communication system has means for precoding control for processing a plurality of spatial data streams. The means includes a function by means of which the receiver selects precoding matrices for different polarized waves of a data transmission and a function by means of which the transmitter applies the selected precoding matrices respectively to different polarized waves of the data transmission.

These and other characteristics and advantages of the present invention will be more clearly understood by reference to detailed descriptions on embodiments of the present invention provided below, in conjunction with the accompanying drawings and the appended claims.

Preferred embodiments of the present invention are described in detail by reference to the accompanying drawings. Detailed descriptions on known functions and configurations taken into the embodiments are omitted from the followings in consideration of clearness and brevity.

FIG. 1 is a block diagram showing an example configuration of a MIMO system having one transmitter and one receiver. The MIMO system using a plurality of cross-polarized antennas is described by reference to the example configuration shown in FIG. 1. The MIMO system uses a plurality of transmission antennas and a plurality of reception antennas for data transmission. A cross-polarized configuration is used for a plurality of transmitter antennas and a plurality of receiver antennas. The transmitter represents a plurality of inputs, whilst the receiver represents a plurality of outputs. Data streams are transmitted from cross-polarized transmitter antennas to cross-polarized receiver antennas by way of a wireless MIMO channel.

As shown in FIG. 1, a transmitter 150 inputs a data sequence to be transmitted as an input bit sequence; encodes the input bit sequence in a channel encoding section 102; and subsequently modulates the thus-encoded input bit sequence in a symbol mapping section 104, to thus produce a modulated symbol. A spatial multiplex and transmission diversity section 106 subjects the modulated symbol to spatial multiplex and transmission diversity processing, to thus produce a plurality of spatial streams. A precoding section 108 applies precoding to the plurality of spatial streams. Subsequently, an antenna mapping section 109 maps precoded spatial streams $S_1$ to $S_4$ to a plurality of transmission antennas and transmits the thus-mapped streams from respective antennas 110a to 110d (Ant1 to Ant4).

The spatial streams transmitted from the transmitter 150 are transmitted by way of a corresponding MIMO channel. Reception antennas 112a to 112d (Ant1 to Ant4) of a receiver 160 receive the spatial streams as spatial streams $r_1$ to $r_4$. A channel estimation and precoding selection section 114 of the receiver 160 estimates a channel response matrix of the MIMO channel by use of a reference signal. According to the thus-estimated channel response matrix, the channel estimation and precoding selection section selects a precoding matrix and then feeds back to the transmitter 150 precoding information PMI that specifies the selected precoding matrix V. A MIMO detection section 116 subjects the spatial streams to MIMO separation processing by use of the channel response matrix, thereby detecting and separating a plurality of data streams delivered from the transmission antennas. Subsequently, a demultiplexing section 118 that performs processing, which is an inverse of processing performed by the spatial multiplex and transmission diversity section 106, rearranges the separated, detected streams into one symbol sequence. Further, a demapping section 120 that performs processing which is an inverse of processing of the symbol mapping section 104 subjects the symbol sequence to demodulation processing on a per-symbol basis. Subsequently, a decoding section 122 that performs processing which is an inverse of processing of the channel encoding section 102 subjects a demodulation result to error correction decoding processing, thereby reproducing the data sequence transmitted from the transmitter 150 and outputs the thus-reproduced data sequence as an output bit sequence.

The MIMO channel formed by means of the reception antennas of the receiver and the transmission antennas of the transmitter is characterized by an N-by-M (N×M) channel response matrix H defined by the number of transmitter antennas M and the number of receiver antennas N.

The channel response matrix H is decomposed by use of singular value decomposition, so that a corresponding projection matrix; namely, a right singular matrix, can be acquired. Singular value decomposition of the channel response matrix H is represented by Expression (1) provided below.

[Mathematical Expression 1]

$$H = U \Lambda V^H \quad (1)$$

Reference symbol U denotes an N-by-N (N×N) unitary matrix made up of a left eigenvector of H; A denotes an (N×M) diagonal matrix made up of a singular value of H; V denotes an (M×M) unitary matrix made up of a right eigenvector; and an superscript H denotes a conjugate transpose matrix. A unitary matrix X is characterized by a characteristic formula $X^H X = I$, where I denotes a unit matrix. Columns of the unitary matrix are orthogonal to each other.

The transmitter subjects communication data to spatial processing by use of the right eigen value vector V of the channel response matrix H as a precoding matrix. The receiver can estimate an actual channel response matrix H^ from a reference signal transmitted by the transmitter. For this reason, a precoding matrix V^ is derived from Expression (1) and can be quantified. Here, a matrix H, a matrix V, and the like, not having symbol ^ denote theoretical values. By contrast, a matrix H^, a matrix V^ (symbol ^ is put on a letter, such as H, to be exact, as can be seen from expressions provided below), or the like, represents a channel response matrix estimated by means of the reference signal and a matrix that has been determined by use of a code book, or the like, and that is to be actually applied. The same also applies to any counterparts in the following descriptions. The receiver feeds back the selected precoding matrix V^ to the transmitter, thereby reporting the precoding matrix to be used in transmission. The transmitter can thereby transmit data in a main unique mode of the MIMO channel. In the embodiment, a method conforming to the code book is assumed to be used in selecting a precoding matrix. Under the precoding method conforming to the code book, the precoding matrix is selected from one predetermined code book C={$C_1, C_2, \ldots, C_L$}, where the code book C includes the number L of unitary matrices.

As already mentioned in connection with the background art, a code book using block diagonal matrices is conceivable as being intended for precoding of the cross-polarized MIMO system. Specifically, a code book C including the number L of block diagonal matrices is used in precoding operation of a transmitter in relation to data transmission exchanged between the transmitter having cross-polarized transmission antennas and a receiver having cross-polarized reception antennas.

However, in connection with the MIMO channel, a premise for ideal XPD is applied for the code book of this type. In this case, the channel matrix can be approximated by a block diagonal matrix. In general, however, ideal XPD cannot always be expected, and orthogonality existing between a vertical polarized wave and a horizontal polarized wave cannot be maintained at that time. For this reason, a precoding matrix using a code book of this type cannot be matched to a structure of a channel matrix at this time. As a consequence, when conditions for ideal XPD are not satisfied, precoding performance is deteriorated.

Mutual interference developing between the vertical polarized wave and the horizontal polarized wave causes an extremely important problem, which would result in performance deterioration in the event of incomplete XPD, in relation to the cross-polarized MIMO structure. Reference symbol α denoting a value of XPD falls within a range of $0 \leq \alpha \leq 1$. In the case of ideal XPD, α becomes nearly equal to 0 ($\alpha \approx 0$). A channel response matrix H achieved when cross-polarized antennas are used can be approximated by means of Expression (2) provided below.

[Mathematical Expression 2]

$$H = X \Theta (R_t^{1/2} H_w R_r^{1/2}) \quad (2)$$

Reference symbol $R_t$ denotes a transmission-side ($M_t \times M_t$) covariance matrix that shows a correlation coefficient existing between polarized waves of the transmitter. Reference symbol $R_r$ denotes a receiving-side ($M_r \times M_r$) covariance matrix that shows a correlation coefficient existing between polarized waves of the receiver. Reference symbol $H_w$ denotes a complex Gaussian matrix that shows a fading component achieved when no correlation exists between polarized waves and when the polarized waves are independent of each other. Reference symbol Θ denotes an Hadamard product. Further, reference symbol X denotes an XPD-based matrix. In the case of a 4-by-2 (4×2) matrix and a 4-by-4 (4×4) matrix, the matrices are defined as represented by Expressions (3) provided below.

[Mathematical Expressions 3]

$$X = \begin{bmatrix} 1 & 1 & \sqrt{\alpha} & \sqrt{\alpha} \\ \sqrt{\alpha} & \sqrt{\alpha} & 1 & 1 \end{bmatrix} \quad (4 \times 2)$$

$$X = \begin{bmatrix} 1 & 1 & \sqrt{\alpha} & \sqrt{\alpha} \\ 1 & 1 & \sqrt{\alpha} & \sqrt{\alpha} \\ \sqrt{\alpha} & \sqrt{\alpha} & 1 & 1 \\ \sqrt{\alpha} & \sqrt{\alpha} & 1 & 1 \end{bmatrix} \quad (4 \times 4)$$

(3)

Therefore, when the channel response matrix H is represented by Expression (4) provided below and when XPD is incomplete, an upper right component $h_{VH}$ and a lower left component $h_{HV}$ do not come to zero because of interference existing between polarized waves. Accordingly, when precoding is performed by use of the precoding matrix derived from the block diagonal matrix, the components that are not zero are not utilized, and performance is deteriorated.

[Mathematical Expression 4]

$$H = \begin{bmatrix} h_{VV} & h_{VH} \\ h_{HV} & h_{HH} \end{bmatrix} \quad (4)$$

The present embodiment is a proposal for orthogonalizing an effective channel between different polarized waves as much as possible by means of applying the precoding operation custom-designed for cross polarized waves in order to reduce interference between polarized waves in the cross-polarized MIMO system. In the present embodiment, a system and a method for enhancing performance of a communication channel of a communication system are provided, thereby enhancing; for instance, transmission performance of the cross-polarized MIMO system. Specifically, in the present embodiment, the MIMO technique is used to increase frequency usage efficiency of uplink communication and downlink communication through the cellular wireless communication network. Moreover, there is provided a precoding method for higher-order MIMO and also for MIMO transmission using a cross-polarized antenna structure that is effective for spatial restrictions on antenna installation. The channel response matrix of the MIMO channel is used at this time, whereby the receiver selects an appropriate precoding matrix for each polarized wave as a precoding matrix specifically designed for the cross-polarized MIMO system. Interference existing between a horizontal polarized wave and a vertical polarized wave is thereby minimized, to thus compensate for a poor XPD characteristic of the channel. Thus, an inaccurate match existing between the precoding matrix and the channel matrix is thereby eliminated. In the present embodiment, a dimensional size of the precoding matrix is reduced by use of sub-section precoding control operation involving performing precoding in sub-sections separated for respective polarized waves, thereby minimizing influence on signaling overhead.

(First Embodiment)

Figure 2:
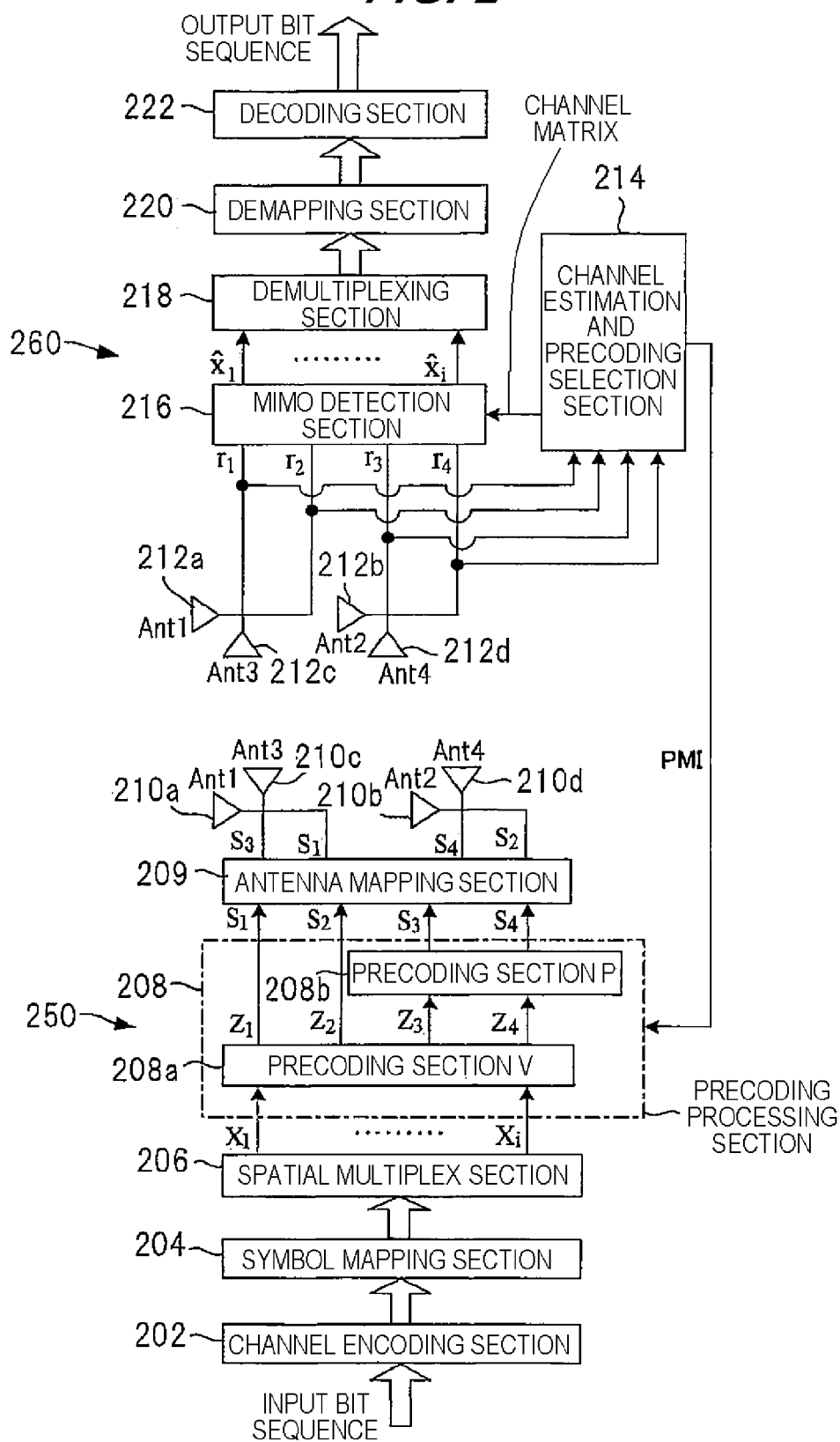
FIG. 2 is a block diagram showing, as a first embodiment of the present invention, a first example configuration of a wireless communication system using a cellular wireless communication network.

FIG. 2 is a block diagram showing a first example configuration of a wireless communication system using a cellular wireless communication network as a first embodiment of the present invention. The first embodiment shows an example configuration achieved when a transmitter and a receiver each have a plurality of (four in the embodiment) cross-polarized antennas and transmit a plurality of data streams $X_1$ to $X_j$. A wireless communication system exemplified herein uses a transmitter BS and a receiver UE and establishes a downlink communication between one transmitter and one receiver by means of a MIMO technique. The number of antennas is not limited to four, and a plurality of antennas can be set as required.

The cross-polarized MIMO system of the first embodiment has a transmitter 250 serving as BS and a receiver 260 serving as UE. The transmitter 250 transmits a spatially multiplexed data stream to the receiver 260 by way of a MIMO channel by means of MIMO communication. The transmitter 250 has four transmission antennas 210*a* (Ant1 ), 210*b* (Ant2 ), 210*c* (Ant3 ), and 210*d* (Ant4 ) each of which have a cross-polarized configuration. The receiver 260 has four reception antennas 212a (Ant1), 212b (Ant2), 212c (Ant3), and 212d (Ant4) each of which has a cross-polarized configuration.

In the configuration of the present embodiment, the MIMO channel formed from the reception antennas of the receiver and the transmission antennas of the transmitter is characterized by a 4-by-4 (4×4) channel response matrix H.

A channel response matrix $\hat{H}$ is estimated by the receiver from a reference signal transmitted by the transmitter. The channel response matrix $\hat{H}$ is represented by Expression (5) provided below and decomposed into each of polarized waves; namely, a vertical polarized wave and a horizontal polarized wave.

[Mathematical Expression 5]

$$\hat{H} = \begin{bmatrix} \hat{h}_{VV} & \hat{h}_{VH} \\ \hat{h}_{HV} & \hat{h}_{HH} \end{bmatrix} = \begin{bmatrix} \hat{H}_V & \hat{H}_H \end{bmatrix} \quad (5)$$

Reference symbol $\hat{H}_V$ denotes a channel response matrix corresponding to a channel existing between a transmission antenna and a reception antenna for a vertical polarized wave. Reference symbol $\hat{H}_H$ denotes a channel response matrix corresponding to a channel existing between a transmission antenna and a reception antenna for a horizontal polarized wave. Singular value decomposition of the channel response matrices $\hat{H}_V$ and $\hat{H}_H$ is represented by Expressions (6) provided below.

[Mathematical Expressions 6]

$$\hat{H}_V = \hat{U}_1 \hat{\Lambda}_1 \hat{V}_1^H \quad \hat{H}_H = \hat{U}_2 \hat{\Lambda}_2 \hat{V}_2^H \quad (6)$$

Reference symbol $\hat{U}_1$ denotes a 4-by-4 (4×4) unitary matrix consisting of a left eigen vector of $\hat{H}_V$; $\hat{\Lambda}_1$ denotes a 4-by-2 (4×2) diagonal matrix consisting of a singular value of $\hat{H}_V$; and $\hat{V}_1$ denotes a 2-by-2 (2×2) unitary matrix consisting of a right eigen vector of $\hat{H}_V$. Reference symbol $\hat{U}_2$ denotes a 4-by-4 (4×4) unitary matrix consisting of a left eigen vector of $\hat{H}_H$; $\hat{\Lambda}_2$ denotes a 4-by-2 (4×2) diagonal matrix consisting of a singular value of $\hat{H}_H$; and $\hat{V}_2$ denotes a 2-by-2 (2×2) unitary matrix consisting of a right eigen vector of $\hat{H}_H$.

According to the embodiment of the present invention, precoding using the unitary matrix is applied to each of the polarized waves. The thus-precoded channel response matrix is orthogonalized with respect to the other channel response matrix (or orthogonalized as much as possible). Specifically, a precoding matrix P of the unitary matrix is selected for one polarized wave; for instance, a horizontal polarized wave. A data symbol is spatially processed as shown in FIG. 2. At this time, a precoding section P performs precoding using the precoding matrix P. Orthogonality Φ existing between the vertical polarized wave and the horizontal polarized wave can be evaluated by means of a formula that is used for determining a diagonal sum (a trace) of inner products of the precoding matrix represented by Expression (7) provided below.

[Mathematical Expression 7]

$$\Phi = tr(\hat{V}_2^H P \hat{V}_1) \quad (7)$$

Accordingly, in order to minimize interference between different polarized waves, an optimum precoding matrix P is calculated by determining a minimum value such that Φ assumes a predetermined value or less as represented by Expression (8) provided below.

[Mathematical Expression 8]

$$P = \arg\min_{PP^H=1} \Phi = \arg\min_{PP^H=1} tr(\hat{V}_2^H P \hat{V}_1) \quad (8)$$

Under the channel optimization method, it is necessary to quantify an optimum precoding matrix P and return the thus-quantified matrix P to the transmitter, which results in use of an important feedback band. In order to reduce feedback overhead, a method based on a code book is used at the time of selection of the precoding matrix P in the embodiment.

Under the method based on a code book, a precoding matrix is selected from a predetermined code book including a preset matrix group. For instance, the precoding matrix P can be selected from the code book $C=[C_1, C_2, \ldots, C_L]$ in order to minimize interference between polarized waves. The code book C includes the number L of 2-by-2 (2×2) unitary matrices. The number L of unitary matrices selected for the code book C is arbitrary. For instance, the number of DFTs employed during signal processing can be used.

The best precoding matrix $P=C_i$ for minimizing interference between polarized waves is selected from the matrices including the minimum Φ as represented by Expression (9) provided below.

[Mathematical Expression 9]

$$i = \arg\min_{C_i \in C} \Phi = \arg\min_{C_i \in C} tr(\hat{V}_2^H C_i \hat{V}_1) \quad (9)$$

Different specifics can be given to the code book by use of different performance and different requirements for complexity. By way of example, the number L of unitary matrix determined by DFTs can be formed in the code book C as represented by Expression (10) provided below.

[Mathematical Expression 10]

$$C = \left\{ \begin{bmatrix} 1 & 0 \\ 0 & 1 \end{bmatrix}, \frac{1}{\sqrt{2}} \begin{bmatrix} 1 & 0 \\ 0 & \exp(j2\pi k/4) \end{bmatrix} \begin{bmatrix} 1 & 1 \\ 1 & -1 \end{bmatrix}, k=0,\ldots,3 \right\} \quad (10)$$

The same code book can also be used for selecting precoding matrices $V_1$ and $V_2$ in a precoding section V that subjects respective polarized waves to precoding. In order to facilitate implementation of the embodiment, channel responses to different polarized waves are assumed to be identical with each other, and a single matrix is also assumed to be usable as the precoding matrices $V_1$ and $V_2$ for precoding the respective polarized waves.

As a result of use of the precoding method proposed in the embodiment, the receiver must feed back the selected precoding matrix or an index of the code book to the transmitter and report a precoding matrix to be used for transmitting a different polarized wave from a different antenna group.

The present invention provides a method effective for precoding control in the cross-polarized MIMO system. According to the embodiment, the precoding matrix P is selected so as to minimize interference between the vertical polarized wave and the horizontal polarized wave, thereby compensating for a poor XPD characteristic in the MIMO channel. Concurrently, in the embodiment, the code book used in the cross-polarized MIMO system includes matrices that are lower in order than matrices included in the code book employed in a single polarized MIMO system. For instance, a 4-by-4 (4×4) code book can be used for a system using eight transmission antennas. Appropriate signaling overhead can thereby be maintained for precoding control.

As shown in FIG. 2, the transmitter 250 has a channel encoding section 202, a symbol mapping section 204, a spatial multiplexing section 206, a precoding processing section 208, an antenna mapping section 209, and four cross-polarized transmission antennas 210a to 210d. The precoding processing section 208 has a first precoding section 208a that applies a precoding matrix V to polarized waves and a second precoding section 208b that applies a precoding matrix P to the polarized waves. In the transmitter 250, functions of a transmission section are materialized by means of the antenna mapping section 209, an unillustrated RF section, and the transmission antennas 210a to 210d.

A data sequence to be transmitted is input as an input bit sequence to the transmitter 250. The channel encoding section 202 subjects the input bit sequence to error correction encoding processing, to thus encode the input bit sequence. Subsequently, the symbol mapping section 204 modulates the thus-encoded bit sequence according to a predetermined modulation scheme, such as QPSK and 16QAM, thereby producing a modulated symbol. The spatial multiplexing section 206 subjects the modulated symbol to spatial multiplex processing, thereby generating a plurality of spatial streams $X_1$ to $X_i$. Subsequently, the precoding processing section 208 simultaneously subjects one-half of the plurality of spatial streams $X_1$ to $X_i$ and the remaining spatial streams to precoding processing. First, the first precoding section 208a applies the precoding matrix V to all of the spatial streams $X_1$ to Xi, thereby precoding the spatial streams. Subsequently, the second precoding section 208b applies the additional precoding matrix P to data streams $Z_3$ and $Z_4$ among the plurality of precoded data streams $Z_1$ to $Z_4$, thereby precoding the data streams. Thus, precoded spatial streams $S_1$, $S_2$, $S_3$, and $S_4$ are obtained. The antenna mapping section 209 maps the precoded spatial streams $S_1$ to $S_4$ to the plurality of transmission antennas and transmits the thus-mapped streams from antennas 210a to 210d (Ant1 to Ant4) that differ from each other in terms of a polarized wave. In an illustrated embodiment, the antennas 210a (Ant1) and 210b (Ant2) are vertically polarized antennas, and the antennas 210c (Ant3) and 210d (Ant4) are horizontally polarized antennas. The spatial streams $S_3$ and $S_4$ transmitted from the horizontally polarized transmission antennas are subjected to precoding that uses the additional precoding matrix P, thereby acquiring orthogonality between the polarized waves.

The spatial streams transmitted from the transmitter 250 pass through corresponding MIMO channels and are received by the reception antennas 212a to 212d in the receiver 260. The receiver 260 has the four cross-polarized reception antennas 212a to 212d; a channel estimation and precoding selection section 214; a MIMO detection section 216; a demultiplexing section 218; a demapping section 220; and a decoding section 222. In the receiver 260, functions of a receiving section are realized by means of the reception antennas 212a to 212d, an unillustrated RF section, and the like. Further, the MIMO detection section 216 realizes a function of a signal separation section. Functions of a decoding section are realized by means of the demultiplexing section 218, the demapping section 220, the decoding section 222, and the like. The channel estimation and precoding selection section 214 has a function of a channel estimation section, a function of a precoding selection section, and a function of a control information notification section.

In the receiver 260, the channel estimation and precoding selection section 214 estimates a propagation path by use of a reference signal among the signals received by the reception antennas 212a to 212d, thereby estimating a channel response matrix of the MIMO channel between the transmitter 250 and the receiver 260. A result of estimation of the propagation path is output as a channel matrix to the MIMO detection section 216. As represented by Expressions (5) to (10), the channel estimation and precoding selection section 214 decomposes the thus-estimated channel response matrix and selects the precoding matrices V and P according to the precoding method of the embodiment. Subsequently, precoding information PMI is output, as indices of the precoding matrices V and P selected by the channel estimation and precoding selection section 214, and fed back to the transmitter 250.

The MIMO detection section 216 subjects data signals $r_1$, $r_2$, $r_3$, and $r_4$ among signals received by the reception antennas to MIMO separation processing by use of the channel matrix, to thus detect and separate data streams from the transmitter and thereby acquire separated streams $\hat{X}_1$ to $\hat{X}_i$. Subsequently, the demultiplexing section 218 that performs processing which is an inverse of processing performed by the spatial multiplexing section 206 rearranges the separated, detected streams into one symbol sequence. The demapping section 202 that performs processing which is an inverse of processing performed by the symbol mapping section 204 subjects the symbol sequence to demodulation processing on a per-symbol basis. Subsequently, the decoding section 222 that performs processing which is an inverse of processing performed by the channel encoding section 202 subjects the symbol sequence to error correction decoding processing, to thus reproduce the data sequence transmitted from the transmitter 250 and output as an output bit sequence.

Figure 3:
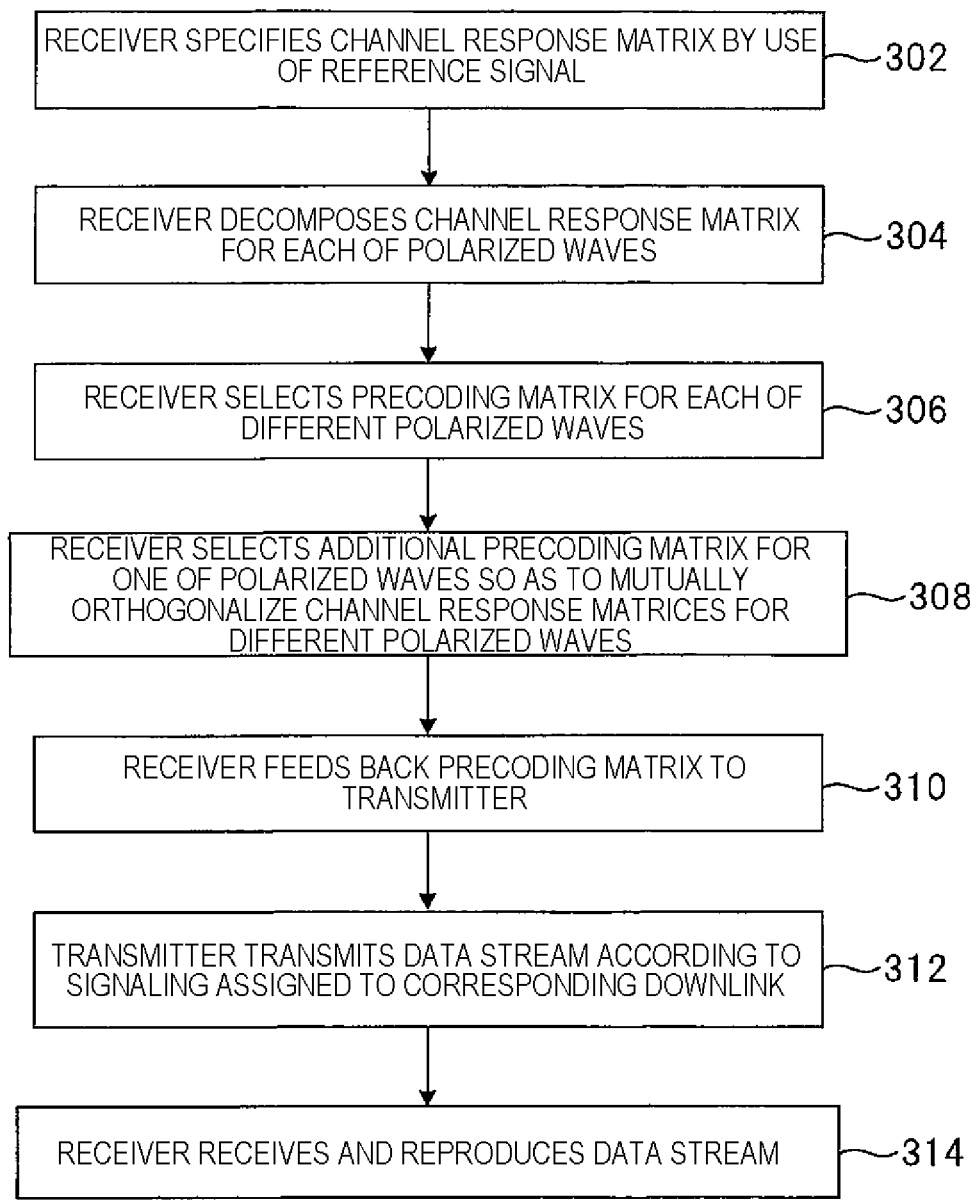
FIG. 3 is a flowchart showing operation procedures of the present embodiment.

FIG. 3 is a flowchart showing operation procedures of the embodiment and illustrates a method for performing MIMO transmission over the MIMO channel in the cross-polarized MIMO system. First, in step 302, the receiver estimates a channel response matrix between the plurality of antennas of the transmitter and the plurality of antennas of the receiver by use of the reference signal RS transmitted from the transmitter. Next, in step 304, the receiver decomposes the channel response matrix into a part that represents channel responses from different polarized transmission antennas, in order to acquire channel response matrices for respective polarized waves. The channel response matrix is decomposed into two parts so as to separate the polarized waves into vertically polarized waves and horizontally polarized waves.

In step 306, the receiver calculates precoding matrices or selects the same from the code book in response to data transmission of different polarized waves from the transmitter. Two precoding matrices are now selected in response to the vertically polarized wave and the horizontally polarized wave. In step 308, the receiver calculates an additional precoding matrix derived from a projection matrix or selects the same from the code book, in response to data transmission of one polarized wave from the transmitter in such a way that precoded channel response matrices for different polarized waves are mutually orthogonalized or can be orthogonalized as much as possible. In step 310, the receiver feeds back to the transmitter precoding information that specifies a selected precoding matrix.

In step 312, the transmitter generates and transmits a data stream from signaling assigned to a corresponding downlink including information on the precoding matrix and a transmission rate. Finally, in step 314, the receiver receives the data stream transmitted from the transmitter and detects MIMO, thereby acquiring the data stream to be reproduced.

As mentioned above, in the present embodiment, an appropriate precoding matrix is selected for each different polarized wave, and the transmitter applies stricter precoding conforming to one polarized wave to the polarized waves. For this reason, the receiver selects an appropriate precoding matrix by use of a channel response matrix and minimizes interference between the horizontally polarized wave and the vertically polarized wave, thereby compensating for a poor XPD characteristic in the channel. The channel response matrix is divided at this time for each of the polarized waves and applies an additional precoding matrix to one polarized wave in such a way that the channel response matrices between the polarized waves is mutually orthogonalized or orthogonalized as much as possible. Even when the cross-polarized MIMO system does not acquire an ideal XPD, interference between the different polarized waves can be lessened, and a loss due to interference is curtailed, so that transmission performance can be enhanced.

The first embodiment shown in FIG. 2 shows a common embodiment taking into consideration of transmission of a plurality of streams in the 4-by-4 cross-polarized MIMO system. As will be described in connection with second to fifth embodiments shown in FIGS. 4 to 7, the present invention can be applied to transmission examples of different ranks. Here, the word "rank" is equivalent to the number of data streams transmitted in a multiplexed form.

(Second Embodiment)

Figure 4:
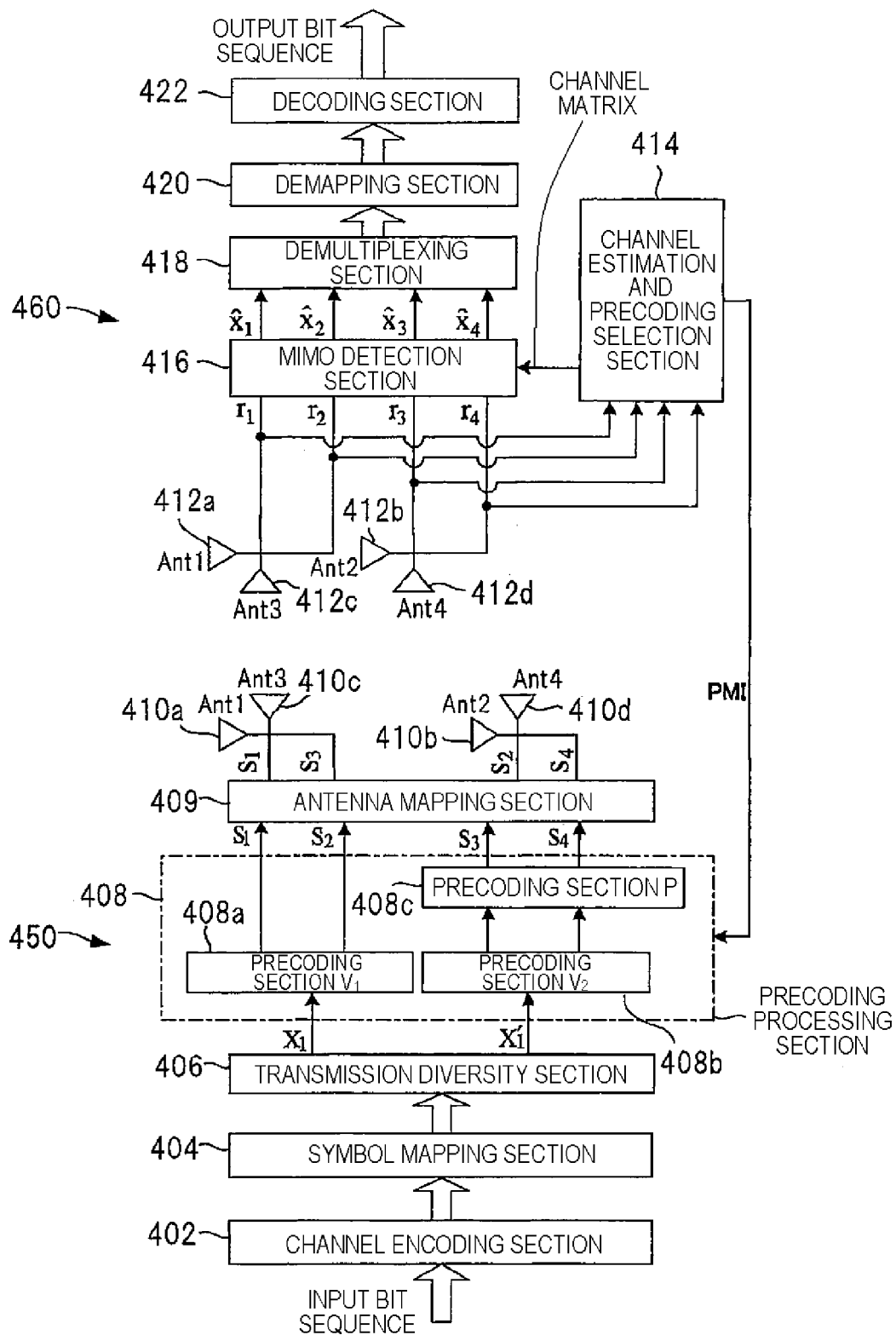
FIG. 4 is a block diagram showing, as a second embodiment of the present invention, a second example configuration of the wireless communication system using the cellular wireless communication network.

FIG. 4 is a block diagram showing, as a second embodiment of the present invention, a second example configuration of the wireless communication system using the cellular wireless communication network. The second embodiment is an example configuration taking into consideration a rank-1 transmission (the number of transmission streams is one) performed in the 4-by-4 cross-polarized MIMO system. A transmitter 450 has four transmission antennas 410a to 410d (Ant1 to 4) each of which has a cross-polarized structure, and the receiver 460 has four reception antennas 412a to 412d (Ant1 to 4) each of which has a cross-polarized configuration. A spatially multiplexed data stream is transmitted from the transmitter 450 to the receiver 460 by means of MIMO transmission and by way of a MIMO channel.

The transmitter 450 includes a channel encoding section 402, a symbol mapping section 404, a transmission diversity section 406, a precoding processing section 408, and an antenna mapping section 409. The precoding processing section 408 includes a first precoding section 408a that applies a precoding matrix $V_1$ to polarized waves, a second precoding section 408b that applies a precoding matrix $V_2$ to the polarized waves, and a third precoding section 408c that applies a precoding matrix P to the polarized waves.

In the transmitter 450, the channel encoding section 402 encodes an input bit sequence, and the symbol mapping section 404 subsequently modulates the bit sequence, to thus produce a modulated symbol. The transmission diversity section 406 subjects the modulated symbol to transmission diversity processing, thereby producing two spatial streams $X_1$ and $X_1'$. Since transmission is ranked one in this case, the spatial streams $X_1$ and $X_1'$ for transmission diversity are generated from one stream $X_1$. Subsequently, the precoding processing section 408 subjects the two spatial streams $X_1$ and $X_1'$ to precoding processing. First, the first precoding section 408a applies the precoding matrix $V_1$ to the spatial stream $X_1$, thereby precoding the spatial stream. The second precoding section 408b applies the precoding matrix $V_2$ to the spatial stream $X_1'$, thereby precoding the spatial stream. The third precoding section 408c then applies the additional precoding matrix P to the one precoded spatial stream $X_1'$, thereby precoding the spatial stream. Thus, precoded spatial streams $S_1$, $S_2$, $S_3$, and $S_4$ are acquired. The antenna mapping section 409 maps the precoded spatial streams $S_1$ to $S_4$ to the plurality of transmission antennas, thereby transmitting spatial streams from the vertical polarized transmission antennas 410a and 410b and the horizontal polarized transmission antennas 410c and 410d. In this case, the spatial streams $S_3$ and $S_4$ ($X_1'$) transmitted from the horizontal polarized transmission antennas are subjected to precoding using the additional precoding matrix P, thereby achieving orthogonality between the polarized waves.

The spatial streams transmitted from the transmitter 450 pass through a corresponding MIMO channel and are received by the reception antennas 412a to 412d in the receiver 460. The receiver 460 has a channel estimation and precoding selection section 414, a MIMO detection section 416, a demultiplexing section 418, a demapping section 420, and a decoding section 422.

In the receiver 460, the channel estimation and precoding selection section 414 estimates a propagation path by use of a reference signal of the received signal, thereby estimating a channel response matrix of the MIMO channel. A result of estimation of a propagation path is output as a channel matrix to the MIMO detection section 416. As represented by Expressions (5) to (9), the channel estimation and precoding selection section 414 decomposes the estimated channel response matrix and selects the precoding matrices $V_1$, $V_2$, and P according to the precoding method of the present embodiment. Subsequently, precoding information PMI is output as indices of the precoding matrices $V_1$, $V_2$, and P selected by the channel estimation and precoding selection section 414, and the thus-output information is fed back to the transmitter 450.

In relation to the code book used in feeding back the precoding matrix P, a matrix can be selected as the code book C shown in Expression (10). Moreover, in relation to the code book used in feeding back the precoding matrices $V_1$ and $V_2$, a matrix can be selected as a code book $\Phi$ shown in Expression (11) provided below.

[Mathematical Expression 11]

$$\Phi = \left\{ \begin{bmatrix} 1 \\ 0 \end{bmatrix}, \begin{bmatrix} 0 \\ 1 \end{bmatrix}, \frac{1}{\sqrt{2}} \begin{bmatrix} 1 \\ \exp(j2\pi k/4) \end{bmatrix}, k = 0, \ldots, 3 \right\} \quad (11)$$

Specifically, a code book $\Phi$ of Expression (11) includes a vector extracted from a first column of the matrix in the code book C of Expression (10). The precoding matrices $V_1$, $V_2$, and P, such as those maintaining orthogonality between polarized waves, are selected by use of the code book, and the indices of the thus-selected precoding matrices are fed back to the transmitter 450.

The MIMO detection section 416 subjects the data signals $r_1$, $r_2$, $r_3$, and $r_4$ of the signals received by the reception antennas to MIMO separation processing by use of the channel matrix, thereby detecting and separating the data stream from the transmitter. Separated streams $\hat{X}_1$ to $\hat{X}_4$ are thus acquired. Subsequently, each of the streams separated and detected by the demultiplexing section 418 is rearranged into one symbol sequence, and the demapping section 420 subjects the thus-rearranged symbol sequences to demodulation processing on a per-symbol basis. Subsequently, the decoding section 422 subjects the demodulated sequences to error correction decoding processing, thereby reproducing the data sequence output from the transmitter 450 and outputting the data sequence as an output bit sequence.

(Third Embodiment)

Figure 5:
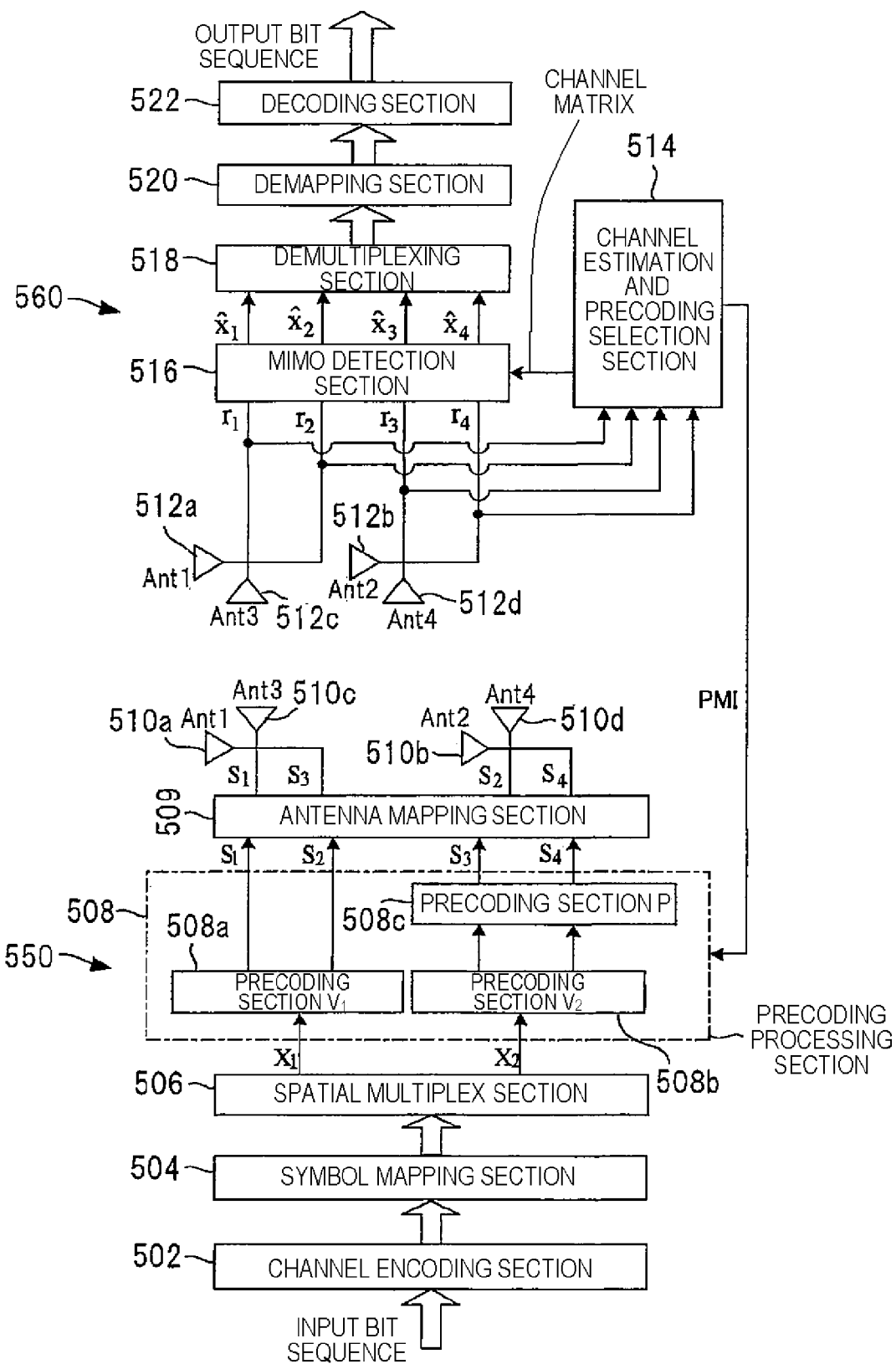
FIG. 5 is a block diagram showing, as a third embodiment of the present invention, a third example configuration of the wireless communication system using the cellular wireless communication network.

FIG. 5 is a block diagram showing, as a third embodiment of the present invention, a third example configuration of the wireless communication system using the cellular wireless communication network. The third embodiment is an example configuration taking into account rank-2 transmission (the number of transmission streams is two) in the 4-by-4 cross-polarized MIMO system. A transmitter 550 has four transmission antennas 510a to 510d (Ant1 to 4) each of which has a cross-polarized configuration. A receiver 560 has four reception antennas 512a to 512d (Ant1 to 4) each of which has a cross-polarized configuration. A spatially multiplexed data stream is transmitted from the transmitter 550 to the receiver 560 by means of MIMO communication and by way of a MIMO channel.

The transmitter 550 has a channel encoding section 502, a symbol mapping section 504, a spatial multiplexing section 506, a precoding processing section 508, and an antenna mapping section 509. The precoding processing section 508 includes a first precoding section 508a that applies a precoding matrix $V_1$ to polarized waves, a second precoding section 508b that applies a precoding matrix $V_2$ to the polarized waves, and a third precoding section 508c that applies a precoding matrix P to the polarized waves.

In the transmitter 550, the channel encoding section 502 encodes an input bit sequence, and the symbol mapping section 504 subsequently modulates the thus-encoded bit sequence, to thus produce a modulated symbol. The spatial multiplexing section 506 subjects the modulated symbol to spatial multiplexing processing, thereby producing two spatial streams $X_1$ and $X_2$. Subsequently, the precoding processing section 508 subjects the two spatial streams $X_1$ and $X_2$ to precoding processing. The first precoding section 508a applies the precoding matrix $V_1$ to the spatial stream $X_1$, thereby precoding the stream. The second precoding section 508b applies the precoding matrix $V_2$ to the spatial stream $X_2$, thereby precoding the stream. Subsequently, the third precoding section 508c applies the additional precoding matrix P to the one precoded spatial stream $X_2$, thereby precoding the stream. Precoded spatial streams $S_1$, $S_2$, $S_3$, and $S_4$ are thereby produced. The antenna mapping section 509 maps the precoded spatial streams $S_1$ to $S_4$ to the plurality of transmission antennas and transmits the spatial streams from the vertically polarized transmission antennas 510a and 510b and the horizontally polarized transmission antennas 510c and 510d. In this case, the spatial streams $S_3$ and $S_4$ ($X_2$) transmitted from the horizontal polarized transmission antennas are subjected to precoding using the additional precoding matrix P, thereby achieving orthogonality between the polarized waves.

The spatial streams transmitted from the transmitter 550 pass through the corresponding MIMO channel and are received by the reception antennas 512a to 512d in the receiver 560. The receiver 560 has a channel estimation and precoding selection section 514, a MIMO detection section 516, a demultiplexing section 518, a demapping section 520, and a decoding section 522.

In the receiver 560, the channel estimation and precoding selection section 514 estimates a propagation path by use of a reference signal, thereby estimating a channel response matrix of the MIMO channel. As represented by Expressions (5) to (9), the channel estimation and precoding selection section 514 decomposes the estimated channel response matrix and selects the precoding matrices $V_1$, $V_2$, and P according to the precoding method of the present embodiment. In relation to the code book used in feeding back the precoding matrix P, the matrix can be selected as the code book C represented by Expression (10). Further, in relation to the code book used in feeding back the precoding matrices $V_1$ and $V_2$, a matrix can be selected as the code book Φ represented by Expression (11). The precoding matrices $V_1$, $V_2$, and P, such as those that maintain orthogonality between polarized waves, are selected by use of these code books. Precoding information PMI is output as indices of the precoding matrices selected by the channel estimation and precoding selection section 514, and the thus-output information is fed back to the transmitter 550.

The MIMO detection section 516 subjects received data signals $r_1$, $r_2$, $r_3$, and $r_4$ to MIMO separation processing by use of the channel matrix, thereby detecting and separating the data stream from the transmitter. Separated streams $\hat{X}_1$ to $\hat{X}_4$ are thus acquired. Subsequently, each of the streams separated and detected by the demultiplexing section 518 is rearranged into one symbol sequence, and the demapping section 520 subjects the thus-rearranged symbol sequences to demodulation processing on a per-symbol basis. Subsequently, the decoding section 522 subjects the demodulated sequences to error correction decoding processing, thereby reproducing the data sequence output from the transmitter 550 and outputting the data sequence as an output bit sequence.

(Fourth Embodiment)

Figure 6:
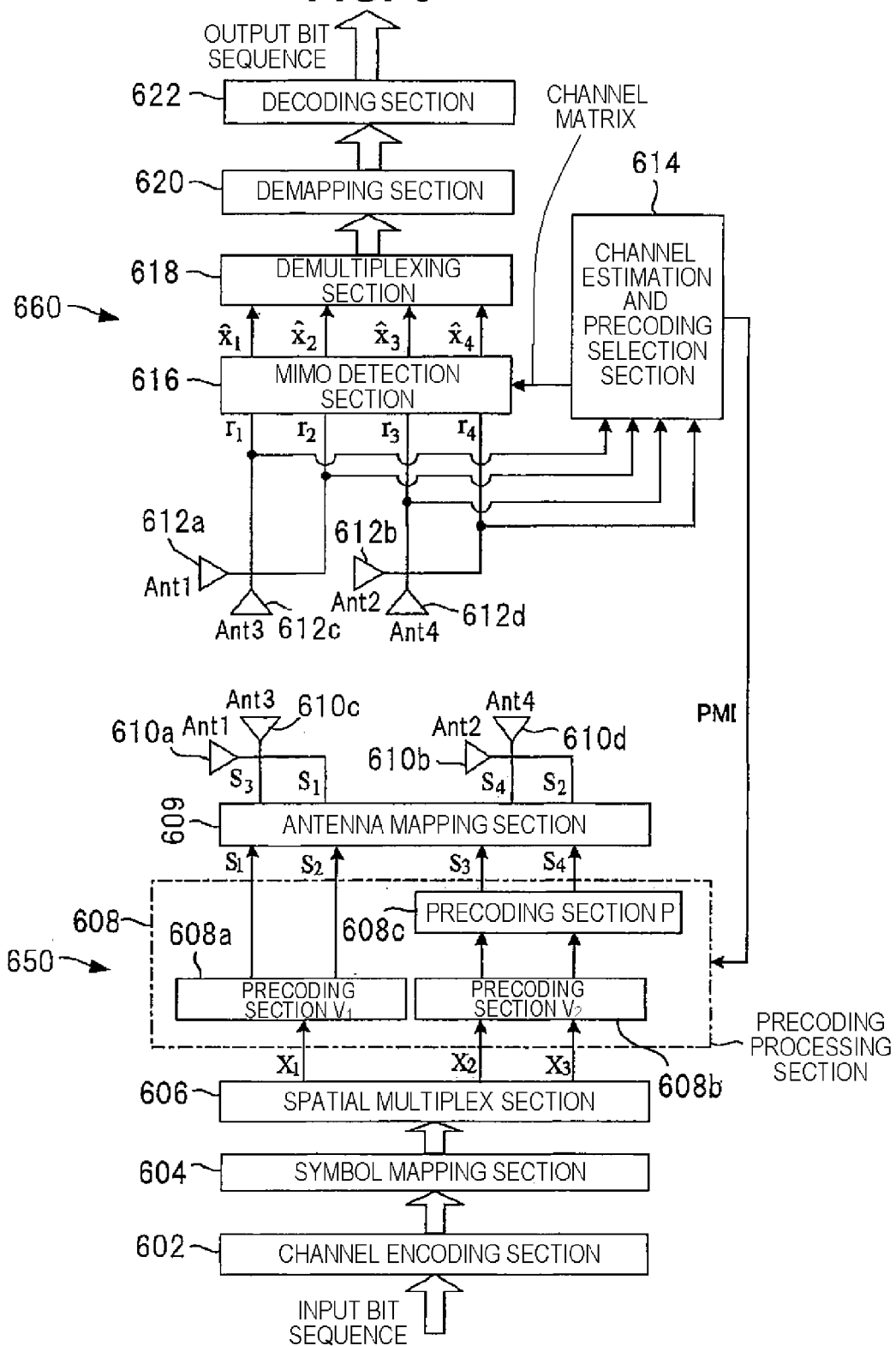
FIG. 6 is a block diagram showing, as a fourth embodiment of the present invention, a fourth example configuration of the wireless communication system using the cellular wireless communication network.

FIG. 6 is a block diagram showing, as a fourth embodiment of the present invention, a fourth example configuration of the wireless communication system using the cellular wireless communication network. The fourth embodiment is an example configuration taking into account rank-3 transmission (the number of transmission streams is three) in the 4-by-4 cross-polarized MIMO system. A transmitter 650 has four transmission antennas 610a to 610d (Ant1 to 4) each of which has a cross-polarized configuration. A receiver 660 has four reception antennas 612a to 612d (Ant1 to 4) each of which has a cross-polarized configuration. A spatially multiplexed data stream is transmitted from the transmitter 650 to the receiver 660 by means of MIMO communication and by way of a MIMO channel.

The transmitter 650 has a channel encoding section 602, a symbol mapping section 604, a spatial multiplexing section 606, a precoding processing section 608, and an antenna mapping section 609. The precoding processing section 608 includes a first precoding section 608a that applies a precoding matrix $V_1$ to polarized waves, a second precoding section 608b that applies a precoding matrix $V_2$ to the polarized waves, and a third precoding section 608c that applies a precoding matrix P to the polarized waves.

In the transmitter 650, the channel encoding section 602 encodes an input bit sequence, and the symbol mapping section 604 subsequently modulates the thus-encoded bit sequence, to thus produce a modulated symbol. The spatial multiplexing section 606 subjects the modulated symbol to spatial multiplexing processing, thereby producing three spatial streams $X_1$, $X_2$, and $X_3$. Subsequently, the precoding processing section 608 subjects to precoding processing each of two spatial stream groups into which the three spatial streams have been divided. Now, the first precoding section 608a applies the precoding matrix $V_1$ to the spatial stream $X_1$, thereby precoding the stream. The second precoding section 608b applies the precoding matrix $V_2$ to the spatial streams $X_2$ and $X_3$. Subsequently, the third precoding section 608c applies the additional precoding matrix P to the spatial streams, thereby precoding the spatial streams. Precoded spatial streams $S_1$, $S_2$, $S_3$, and $S_4$ are thereby produced. The antenna mapping section 609 maps the precoded spatial streams $S_1$ to $S_4$ to the plurality of transmission antennas and transmits the spatial streams from the vertically polarized transmission antennas 610a and 610b and the horizontally polarized transmission antennas 610c and 610d. In this case, the spatial streams $S_3$ and $S_4$ ($X_2$ and $X_3$) transmitted from the horizontal polarized transmission antennas are subjected to precoding using the additional precoding matrix P, thereby achieving orthogonality between the polarized waves.

The spatial streams transmitted from the transmitter 650 pass through the corresponding MIMO channel and are received by the reception antennas 612a to 612d in the receiver 660. The receiver 660 has a channel estimation and precoding selection section 614, a MIMO detection section 616, a demultiplexing section 618, a demapping section 620, and a decoding section 622.

In the receiver 660, the channel estimation and precoding selection section 614 estimates a propagation path by use of a reference signal, thereby estimating a channel response matrix of the MIMO channel. As represented by Expressions (5) to (9), the channel estimation and precoding selection section 614 decomposes the estimated channel response matrix and selects the precoding matrices $V_1$, $V_2$, and P according to the precoding method of the present embodiment. In relation to the code book used in feeding back the precoding matrix $V_1$, the matrix can be selected as the code book $\Phi$ represented by Expression (11). In relation to the code book used in feeding back the precoding matrices $V_2$ and P, the matrix can be selected as the code book C represented by Expression (10). The precoding matrices $V_1$, $V_2$, and P, such as those that maintain orthogonality between polarized waves, are selected by use of these code books. Precoding information PMI is output as indices of the precoding matrices selected by the channel estimation and precoding selection section 614, and the thus-output information is fed back to the transmitter 650.

The MIMO detection section 616 subjects received data signals $r_1, r_2, r_3,$ and $r_4$ to MIMO separation processing by use of the channel matrix, thereby detecting and separating the data stream from the transmitter. Separated streams $\hat{X}_1$ to $\hat{X}_4$ are thus acquired. Subsequently, each of the streams separated and detected by the demultiplexing section 618 is rearranged into one symbol sequence, and the demapping section 620 subjects the thus-rearranged symbol sequences to demodulation processing on a per-symbol basis. Subsequently, the decoding section 622 subjects the demodulated sequences to error correction decoding processing, thereby reproducing the data sequence output from the transmitter 650 and outputting the data sequence as an output bit sequence.

In relation to LTE, processing for preferentially bundling low-order streams and assigning single data to the thus-bundled stream is performed at the time of dynamic control of the number of transmission streams, as specified in Table 6.3.3.2-1: Codeword-to-layer mapping for spatial multiplexing (codeword-to-layer mapping in spatial multiplexing) shown in FIG. 9 with regard to TS (Technical Specification) 36.211 V8.4.0 of 3GPP. More specifically, when the number of transmission streams is three (rank 3: Number of layers=3), data assignment is performed in such a way that $d^{(0)}$ is assigned solely to a stream $x^{(0)}$ and that $d^{(1)}$ uses two streams $x^{(1)}$ and $x^{(2)}$ in a bundled manner. By means of control operation, the transmission side creates, for instance, a situation in which quality becomes worse in sequence from $x^{(0)}$ to $x^{(2)}$ by means of precoding control and uses two degraded-quality streams in a bundled manner, thereby collecting energy of corresponding resources. Thus, it becomes possible to aim for a diversity effect.

Transmission stream assignment control, such as that mentioned above, is applied to the rank-3 transmission of the present embodiment, and processing is performed while one high-quality, high-order stream $X_1$ and low-quality, low-order two streams $X_2$ and $X_3$ are separated from each other, thereby enhancing transmission efficiency as much as possible. The first stream $X_1$ is applied to one polarized wave at this time, and additional precoding is applied to the second stream $X_2$ and the third stream $X_3$, to thus apply the second and third streams to the other polarized wave. Thus, orthogonality between the polarized waves is maintained, whereby transmission performance is enhanced, and higher transmission efficiency is implemented.

(Fifth Embodiment)

Figure 7:
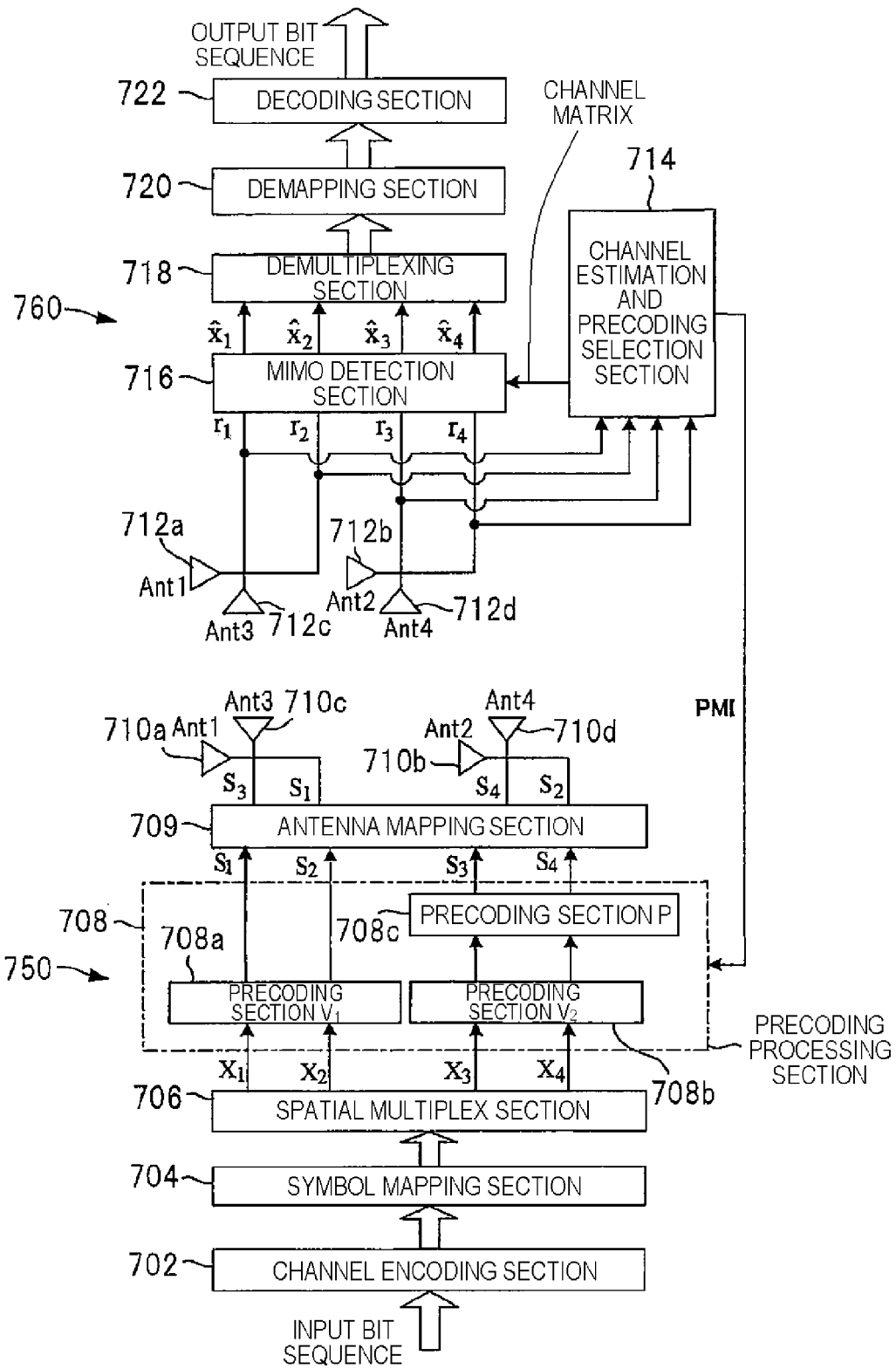
FIG. 7 is a block diagram showing, as a fifth embodiment of the present invention, a fifth example configuration of the wireless communication system using the cellular wireless communication network.

FIG. 7 is a block diagram showing, as a fifth embodiment of the present invention, a fifth example configuration of the wireless communication system using the cellular wireless communication network. The fifth embodiment is an example configuration taking into account full rank transmission (rank-4: the number of transmission streams is four) in the 4-by-4 cross-polarized MIMO system. A transmitter 750 has four transmission antennas 710a to 710d (Ant1 to 4) each of which has a cross-polarized configuration. A receiver 760 has four reception antennas 712a to 712d (Ant1 to 4) each of which has a cross-polarized configuration. A spatially multiplexed data stream is transmitted from the transmitter 750 to the receiver 760 by means of MIMO communication and by way of a MIMO channel.

The transmitter 750 has a channel encoding section 702, a symbol mapping section 704, a spatial multiplexing section 706, a precoding processing section 708, and an antenna mapping section 709. The precoding processing section 708 includes a first precoding section 708a that applies a precoding matrix $V_1$ to polarized waves, a second precoding section 708b that applies a precoding matrix $V_2$ to the polarized waves, and a third precoding section 708c that applies a precoding matrix P to the polarized waves.

In the transmitter 750, the channel encoding section 702 encodes an input bit sequence, and the symbol mapping section 704 subsequently modulates the thus-encoded bit sequence, to thus produce a modulated symbol. The spatial multiplexing section 706 subjects the modulated symbol to spatial multiplexing processing, thereby producing four spatial streams $X_1, X_2, X_3,$ and $X_4$. Subsequently, the precoding processing section 708 subjects to precoding processing each of two spatial stream groups into which the four spatial streams have been divided. Now, the first precoding section 708a applies the precoding matrix $V_1$ to the spatial streams $X_1$ and $X_2$, thereby precoding the streams. The second precoding section 708b applies the precoding matrix $V_2$ to the spatial streams $X_3$ and $X_4$. Subsequently, the third precoding section 708c applies the additional precoding matrix P to the spatial streams, thereby precoding the spatial streams. Precoded spatial streams $S_1, S_2, S_3,$ and $S_4$ are thereby produced. The antenna mapping section 709 maps the precoded spatial streams $S_1$ to $S_4$ to the plurality of transmission antennas and transmits the spatial streams from the vertically polarized transmission antennas 710a and 710b and the horizontally polarized transmission antennas 710c and 710d. In this case, the spatial streams $S_3$ and $S_4$ ($X_3$ and $X_4$) transmitted from the horizontal polarized transmission antennas are subjected to precoding using the additional precoding matrix P, thereby achieving orthogonality between the polarized waves.

The spatial streams transmitted from the transmitter 750 pass through the corresponding MIMO channel and are received by the reception antennas 712a to 712d in the receiver 760. The receiver 760 has a channel estimation and precoding selection section 714, a MIMO detection section 716, a demultiplexing section 718, a demapping section 720, and a decoding section 722.

In the receiver 760, the channel estimation and precoding selection section 714 estimates a propagation path by use of a reference signal, thereby estimating a channel response matrix of the MIMO channel. As represented by Expressions (5) to (9), the channel estimation and precoding selection section 714 decomposes the estimated channel response matrix and selects the precoding matrices $V_1$, $V_2$, and P according to the precoding method of the present embodiment. In relation to the code book used in feeding back the precoding matrices $V_1$, $V_2$, and P, the matrix can be selected as the code book C represented by Expression (10). The precoding matrices $V_1$, $V_2$, and P that maintain orthogonality between the polarized waves are selected by use of the code book. Precoding information PMI is output as indices of the precoding matrices selected by the channel estimation and precoding selection section 714, and the thus-output information is fed back to the transmitter 750.

The MIMO detection section 716 subjects received data signals $r_1, r_2, r_3$, and $r_4$ to MIMO separation processing by use of the channel matrix, thereby detecting and separating the data stream from the transmitter. Separated streams $X^{\wedge}_4$ to $X^{\wedge}_4$ are thus acquired. Subsequently, each of the streams separated and detected by the demultiplexing section 718 is rearranged into one symbol sequence, and the demapping section 720 subjects the thus-rearranged symbol sequences to demodulation processing on a per-symbol basis. The decoding section 722 subsequently subjects the demodulated sequences to error correction decoding processing, thereby reproducing the data sequence output from the transmitter 750 and outputting the data sequence as an output bit sequence.

According to the second to fifth embodiments, effective precoding control which lessens interference between the polarized waves can be performed during transmission of the respective ranks performed in a MIMO system using a cross-polarized antenna structure, so that a SU-MIMO (Single User MIMO) system enhanced in terms of transmission efficiency can thereby be configured. Further, the embodiments employ sub-section precoding control comprising applying the precoding matrices $V_1$ and $V_2$ to sub-sections separated for the respective polarized waves and applying the additional precoding matrix P to one of the polarized waves. Since a dimensional size of the precoding matrices can thereby be reduced, the quantity of information of a code book for the precoding matrices and the number of candidates for selection can be reduced. Thus, lessening of processing imposed on precoding control, like simplification of processing for selecting precoding matrices, can be accomplished. Further, an appropriate amount of signaling can be maintained by minimizing influence on a signaling overhead, so that feedback signaling for controlling precoding can be reduced to the minimum.

When the precoding matrices $V_1$ and $V_2$ are applied to each of the polarized waves during precoding, the same matrix may also be used as the precoding matrices $V_1$ and $V_2$. In this case, in addition to an advantage of the dimension of the precoding matrix being reduced by previously-described sub-section precoding, there is also yielded an advantage of the ability to further curtail the amount of information required for feedback by means of adopting values of a single matrix.

(Sixth Embodiment)

The foregoing embodiments can also be expanded to a case using a greater number of antennas; for instance, a case using eight antennas each of which has a cross-polarized structure. FIG. 8 is a block diagram showing, as a sixth embodiment of the present invention, a sixth example configuration of the wireless communication system using the cellular wireless communication network. The sixth embodiment is an example configuration taking into account full rank transmission (rank-8; the number of transmission streams is eight) in an 8-by-8 cross-polarized MIMO system. A transmitter 850 has eight transmission antennas 810a to 810h (Ant1 to 8) each of which has a cross-polarized configuration. A receiver 860 has eight reception antennas 812a to 812d (Ant1 to 8) each of which has a cross-polarized configuration. A spatially multiplexed data stream is transmitted from the transmitter 850 to the receiver 860 by means of MIMO communication and by way of a MIMO channel.

The transmitter 850 has a channel encoding section 802, a symbol mapping section 804, a spatial multiplexing section 806, a precoding processing section 808, and an antenna mapping section 809. The precoding processing section 808 includes a first precoding section 808a that applies a precoding matrix $V_1$ to polarized waves, a second precoding section 808b that applies a precoding matrix $V_2$ to the polarized waves, and a third precoding section 808c that applies a precoding matrix P to the polarized waves.

In the transmitter 850, the channel encoding section 802 encodes an input bit sequence, and the symbol mapping section 804 subsequently modulates the thus-encoded bit sequence, to thus produce a modulated symbol. The spatial multiplexing section 806 subjects the modulated symbol to spatial multiplexing processing, thereby producing a plurality of (eight in the case of full rank transmission) spatial streams $X_1$ to $X_8$. Subsequently, the precoding processing section 808 subjects to precoding processing each of two spatial stream groups into which the plurality of spatial streams have been divided. Now, the first precoding section 808a applies the precoding matrix $V_1$ to the spatial streams $X_1, X_2, X_3$, and $X_4$, thereby precoding the streams. The second precoding section 808b applies the precoding matrix $V_2$ to the spatial streams $X_5, X_6, X_7$, and $X_8$. The third precoding section 808c subsequently applies the additional precoding matrix P to the spatial streams, thereby precoding the spatial streams. Precoded spatial streams $S_1$ to $S_8$ are thus produced. The antenna mapping section 809 maps the precoded spatial streams $S_1$ to $S_8$ to the plurality of transmission antennas and transmits the spatial streams from the vertically polarized transmission antennas 810a to 810d and the horizontally polarized transmission antennas 810e to 810h that differ from each other in terms of a polarized wave. In this case, the spatial streams $S_5$ to $S_8$ ($X_5$ to $X_8$) transmitted from the horizontal polarized transmission antennas are subjected to precoding using the additional precoding matrix P, thereby achieving orthogonality between the polarized waves.

The spatial streams transmitted from the transmitter 850 pass through the corresponding MIMO channel and are received by the reception antennas 812a to 812h in the receiver 860. The receiver 860 has a channel estimation and precoding selection section 814, a MIMO detection section 816, a demultiplexing section 818, a demapping section 820, and a decoding section 822.

In the receiver 860, the channel estimation and precoding selection section 814 estimates a propagation path by use of a reference signal, thereby estimating a channel response matrix of the MIMO channel. As represented by Expressions (5) to (9), the channel estimation and precoding selection section 814 decomposes the estimated channel response matrix and selects the precoding matrices $V_1$, $V_2$, and P according to the precoding method of the present embodiment. In relation to the code book used in feeding back the precoding matrices $V_1$, $V_2$, and P, the matrix can be selected as the code book C represented by Expression (12).

[Mathematical Expression 12]

$$C = \left\{ \begin{bmatrix} 1 & 0 & 0 & 0 \\ 0 & 1 & 0 & 0 \\ 0 & 0 & 1 & 0 \\ 0 & 0 & 0 & 1 \end{bmatrix}, \frac{1}{\sqrt{4}} \begin{bmatrix} 1 & 0 & 0 & 0 \\ 0 & \exp(j2\pi k/L) & 0 & 0 \\ 0 & 0 & \exp(j4\pi k/L) & 0 \\ 0 & 0 & 0 & \exp(j6\pi k/L) \end{bmatrix} \begin{bmatrix} 1 & 1 & 1 & 1 \\ 1 & j & -1 & -j \\ 1 & -1 & 1 & -j \\ 1 & -j & -1 & j \end{bmatrix} \right\}, \quad (12)$$
$$k = 0, \ldots, L-1$$

The precoding matrices $V_1$, $V_2$, and P that maintain orthogonality between the polarized waves are selected by use of the code book. Precoding information PMI is output as indices of the precoding matrices selected by the channel estimation and precoding selection section 814, and the thus-output information is fed back to the transmitter 850.

The MIMO detection section 816 subjects received data signals $r_1$ to $r_8$ to MIMO separation processing by use of the channel matrix, thereby detecting and separating the data stream from the transmitter. Separated streams $\hat{X}_1$ to $\hat{X}_8$ are thus acquired. Subsequently, each of the streams separated and detected by the demultiplexing section 818 is rearranged into one symbol sequence, and the demapping section 820 subjects the thus-rearranged symbol sequences to demodulation processing on a per-symbol basis. The decoding section 822 subsequently subjects the demodulated sequences to error correction decoding processing, thereby reproducing the data sequence output from the transmitter 850 and outputting the data sequence as an output bit sequence.

Even when eight transmission antennas are used as in the present embodiment, the precoding matrices $V_1$ and $V_2$ are applied to the sub-blocks separated for each of the polarized waves, whereby a dimension of the precoding matrices is reduced. Processing imposed on precoding control operation can thereby be lessened, and the amount of information to be fed back can be reduced. Moreover, applying precoding of the present embodiment to a configuration involving a plurality of transmission antennas makes it possible to increase a gain of beam forming for each polarized wave, so that precoding performance can be enhanced.

The sixth embodiment shows an embodiment taking into account full rank transmission performed in the 8-by-8 cross-polarized MIMO system. Applying the case using eight transmission antennas to transmission of the respective ranks can be implemented by simple expansion of the cases using four transmission antennas described in connection with the second to fifth embodiments shown in FIGS. 4 to 7.

As mentioned above, in the present embodiment, a precoding matrix of the projection matrix are applied to one of the different polarized waves in the cross-polarized MIMO system, thereby making it possible to maintain orthogonality of the channel response matrix between the different polarized waves and dampen interference between the polarized waves. Robustness can thereby be imparted to performance of the MIMO system to which precoding is applied. Further, the precoding matrix of the projection matrix, which is easy to add, is applied solely to one of the polarized waves by use of sub-section precoding, whereby influence on signaling overhead for feeding back control information can be minimized.

The present invention is also expected to be susceptible to various alterations and applications by the skilled in the art without departing the spirit and scope of the present invention and according to the descriptions of the specification and well known techniques, and the alterations and applications shall fall within a range where protection of the invention is sought. Further, the constituent elements described in connection with the respective embodiments can also be arbitrarily combined together without departing the spirit of the present invention.

The number of antennas making up the cross-polarized MIMO system, the number of streams to be transmitted, and the like, are not limited to the configurations described in connection with the embodiments. Two or more antennas and transmission streams can be set as appropriate and applied to the present invention in the same manner as mentioned above. The embodiments have provided the examples in which the present invention is applied to the downlink of the cellular wireless communication network. However, likewise the present invention also applies to another wireless communication line, like an uplink of the cellular wireless communication network.

The present invention has been described as being applied to the antennas in the foregoing embodiments but can also be applied to an antenna port in the same manner. The antenna port herein refers to a logical antenna made up of one physical antenna or a plurality of physical antennas. Specifically, the antenna port is not necessarily limited to one physical antenna but often refers to an array antenna, or the like, made up of a plurality of antennas. For instance, in relation to LTE, the antenna port is not specified in connection with the number of physical antennas making up the antenna port but specified in connection with a minimum unit that makes it possible for a base station to transmit a reference signal. Further, the antenna port is sometimes specified as a minimum unit that multiplies a precoding vector by a weight.

Although the respective embodiments have been described by taking, as an example, a case where the present invention is made up of hardware. The present invention can also be implemented by means of software.

The respective function sections used in the descriptions of the respective embodiments are typically implemented as LSIs that are integrated circuits. The function sections may also be embodied individually as a single chip. Alternatively, the function sections may also be implemented as one chip so as to include some or all of the function sections. Although the function sections are implemented as an LSI, they are called on occasions an IC, a system LSI, a super LSI, and an ultra LSI according to a degree of integration.

The technique for packaging the function sections in the form of an integrated circuit is not limited to the LSI, they may also be implemented as a custom designed circuit or a general purpose processor. Moreover, an FPGA (Field Programmable Gate Array) that can be programmed after manufacture of an LSI or a reconfigurable processor that enables reconfiguration of connections or settings of circuit cells in an LSI can also be utilized.

Furthermore, if a technique for implementing an integrated circuit that can be used as a substitute for an LSI emerges by virtue of a progress in semiconductor techniques or another technique derived from the semiconductor techniques, the function sections may naturally be packaged by use of the technique. Applying biotechnology to packaging the function sections is feasible.

This application is based upon Japanese Patent Application No. 2009-001352 filed on Jan. 7, 2009, the contents of which are incorporated herein by reference in its entirety.

Industrial Applicability

Even when an ideal XPD is not accomplished by the MIMO system using the cross-polarized antenna structure, the present invention makes it possible to dampen interference between different polarized waves, thereby yielding an advantage of the ability to perform effective precoding. The present invention is useful as a wireless communication apparatus, a wireless communication system, and a wireless communication method, such as a cellular wireless system using a MIMO system that performs communication by use of a plurality of antennas.

Reference Signs List 150, 250, 450, 550, 650, 750, 850: TRANSMITTER
160, 260, 460, 560, 660, 760, 860: RECEIVER
102, 202, 402, 502, 602, 702, 802: CHANNEL ENCODING SECTION
104, 204, 404, 504, 604, 704, 804: SYMBOL MAPPING SECTION
106: SPATIAL MULTIPLEX AND TRANSMISSION DIVERSITY SECTION
206, 506, 606, 706, 80:6 SPATIAL MULTIPLEXING SECTION
406: TRANSMISSION DIVERSITY SECTION
108, 208a-c, 408a-c, 508a-c, 608a-c, 708a-c, 808a-c: PRECODING SECTION
208, 408, 508, 608, 708, 808: PRECODING PROCESSING SECTION
109, 209, 409, 509, 609, 709, 809: ANTENNA MAPPING SECTION
110a-d, 210a-d, 410a-d, 510a-d, 610a-d, 710a-d, 810a-h: TRANSMISSION ANTENNA
112a-d, 212a-d, 412a-d, 512a-d, 612a-d, 712a-d, 812a-h: RECEPTION ANTENNA
114, 214, 414, 514, 614, 714, 814: CHANNEL ESTIMATION AND PRECODING SELECTION SECTION
116, 216, 416, 516, 616, 716, 816: MIMO DETECTION SECTION
118, 218, 418, 518, 618, 718, 818: DEMULTIPLEXING SECTION
120, 220, 420, 520, 620, 720, 820: DEMAPPING SECTION
122, 222, 422, 522, 622, 722, 822: DECODING SECTION

The invention claimed is:

1. A communication apparatus comprising:
a receiving section configured to receive control information from a communication partner apparatus, the control information including precoding matrix information (PMI) indicating a first precoding matrix and a second precoding matrix, the first precoding matrix and the second precoding matrix being selected at the communication partner apparatus;
a precoding section configured to apply the first precoding matrix to both of a signal which is to be transmitted from a first set of antennas and a signal which is to be transmitted from a second set of antennas, and to further apply the second precoding matrix only to the precoded signal which is to be transmitted from the second set of antennas, wherein the first set of antennas are cross-polarized with respect to the second set of antennas, and selection of the second precoding matrix is performed in order to maintain an orthogonality between polarized waves from the first set of antennas and further polarized waves from a second set of antennas; and
a transmitting section including the first set of antennas and the second set of antennas, the first set of antennas being configured to transmit the signal on which the first precoding matrix is applied, and the second set of antennas being configured to transmit the signal on which the first precoding matrix and the second precoding matrix are applied.

2. The communication apparatus according to claim 1, wherein
the selection of the first precoding matrix and the second precoding matrix at the communication apparatus is performed using a codebook including a plurality of precoding matrices, a value of the PMI corresponding to an index indicating a precoding matrix included in the codebook.

3. The communication apparatus according to claim 1, wherein
the polarized waves from the first set of antennas are vertically polarized and the polarized waves from the second set of antennas are horizontally polarized.

4. The communication apparatus according to claim 3, wherein
the selection of the second precoding matrix at the communication partner apparatus is performed such that an orthogonality between the vertical polarized wave and the horizontal polarized wave becomes largest.

5. A communication method comprising:
receiving control information from a communication partner apparatus, the control information including precoding matrix information (PMI) indicating a first precoding matrix and a second precoding matrix, the first precoding matrix and the second precoding matrix being selected at the communication partner apparatus;
applying the first precoding matrix to both of a signal which is to be transmitted from a first set of antennas and a signal which is to be transmitted from a second set of antennas, and further applying the second precoding matrix only to the precoded signal which is to be transmitted from the second set of antennas, wherein the first set of antennas are cross-polarized with respect to the second set of antennas, and selection of the second precoding matrix is performed in order to maintain an orthogonality between polarized waves from the first set of antennas and further polarized waves from a second set of antennas; and
transmitting the signal on which the first precoding matrix is applied using the first set of antennas and transmitting the signal on which the first precoding matrix and the second precoding matrix are applied using the second set of antennas.

6. The communication method according to claim 5, wherein
the selection of the first precoding matrix and the second precoding matrix at the communication apparatus is performed using a codebook including a plurality of precoding matrices, a value of the PMI corresponding to an index indicating a precoding matrix included in the codebook.

7. The communication method according to claim 5, wherein the polarized waves from the first set of antennas are vertically polarized, and the polarized waves from the second set of antennas care horizontally polarized.

* * * * *